United States Patent
Lyu et al.

(10) Patent No.: US 11,243,745 B2
(45) Date of Patent: Feb. 8, 2022

(54) TEXT EDITOR BUFFERING IMPLEMENTATION WITH OFFSETS MANAGEMENT

(71) Applicant: Microsoft Technology Licensing, LLC, Redmond, WA (US)

(72) Inventors: Peng Lyu, Issaquah, WA (US); Alexandru Ioan Dima, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 521 days.

(21) Appl. No.: 16/035,648

(22) Filed: Jul. 15, 2018

(65) Prior Publication Data

US 2020/0019384 A1    Jan. 16, 2020

(51) Int. Cl.
*G06F 8/33*     (2018.01)
*G06F 16/22*    (2019.01)
*G06F 40/166*   (2020.01)

(52) U.S. Cl.
CPC .......... *G06F 8/33* (2013.01); *G06F 16/2246* (2019.01); *G06F 40/166* (2020.01)

(58) Field of Classification Search
CPC ...... G06F 40/14; G06F 40/166; G06F 16/322; G06F 40/103; G06F 40/123; G06F 8/33; G06F 16/2246; G06F 40/106
See application file for complete search history.

(56) References Cited

U.S. PATENT DOCUMENTS

| | | | | |
|---|---|---|---|---|
| 5,070,478 A | * | 12/1991 | Abbott | G06F 40/232 715/210 |
| 5,224,038 A | * | 6/1993 | Bespalko | G06F 40/123 715/234 |
| 5,802,539 A | * | 9/1998 | Daniels | G06F 40/166 715/236 |
| 5,857,198 A | * | 1/1999 | Schmidt | G06F 40/226 712/200 |

(Continued)

OTHER PUBLICATIONS

Avery Laird, "Piece Tables, Splay Trees, and 'Trables' (Oh My!)", publisher: averylaird.com, published: May 10, 2018, pp. 1-6) (Year: 2018).*

(Continued)

*Primary Examiner* — Wilson W Tsui
(74) *Attorney, Agent, or Firm* — Oglivie Law Firm

(57) ABSTRACT

A family of piece tree data structures and related algorithms are described, for buffering editable text in a digital memory. A piece tree includes one or more string buffers and a tree, such as a balanced binary tree. Tree nodes identify respective substrings in the buffer(s), and correspond to edits of the content loaded into a text editor. Specific changes in data structures and the impact of those changes on performance relative to other buffering structures are discussed, including reduced memory usage, faster file loading, and the impact of accumulated edit operations. Offsets of text items such as line breaks are tracked, permitting optimizations for locating them in a text. Benchmark testing results are presented. Source code editors provide examples, but the piece tree (Continued)

buffering structures and their related traversal, (re)configuration, and other algorithms can be part of text editors in a variety of application or subject matter areas.

20 Claims, 13 Drawing Sheets

(56) References Cited

U.S. PATENT DOCUMENTS

| | | | | |
|---|---|---|---|---|
| 6,944,821 | B1* | 9/2005 | Bates | G06F 40/166 715/209 |
| 7,992,088 | B2* | 8/2011 | Rose | G06F 40/14 715/724 |
| 2003/0229607 | A1* | 12/2003 | Zellweger | G06F 40/183 |
| 2004/0003349 | A1* | 1/2004 | Ostertag | G06F 40/14 715/234 |
| 2005/0262432 | A1* | 11/2005 | Wagner | G06F 40/166 715/229 |
| 2013/0139087 | A1* | 5/2013 | Eylon | G06F 40/166 715/770 |

OTHER PUBLICATIONS

Joaquin Abela, "Improving the AbiWord's Piece Table", published: Jan. 4, 2003, pp. 1-7 (Year: 2003).*

Matt Samberg, "Line Spacing, Explained", publisher: medium.com, published: Sep. 15, 2015, pp. 1-5 (Year: 2015).*

(Nathan Solo, "Atom's new concurrency-friendly buffer implementation", blog.atom.io, published: Oct. 12, 2017, pp. 1-7). (Year: 2017).*

StackOverflow, "Best Free Text Editor Supporting *More than* 4GB Files?", published: Oct. 2012, pp. 1-7 (Year: 2012).*

Peng Lyu, "Text Buffer Reimplementation", retrieved from <<https://code.visualstudio.com/blogs/2018/03/23/text-buffer-reimplementation>>, Mar. 23, 2018, 13 pages.

"C++ vs JavaScript?", retrieved from <<https://forum.freecodecamp.org/t/c-vs-javascript/155244/13>>, Oct. 2017, 6 pages.

Vyacheslav Egorov, "Maybe you don't need Rust and WASM to speed up your JS", retrieved from <<https://mrale.ph/blog/2018/02/03/maybe-you-dont-need-rust-to-speed-up-your-js.html>>, Feb. 3, 2018, 49 pages.

"Piece table", retrieved from <<https://en.wikipedia.org/wiki/Piece_table>>, Mar. 8, 2018, 2 pages.

"Visual Studio Code: Updates: Feb. 2018 (version 1.21)", retrieved from <<https://code.visualstudio.com/updates/v1_21#_text-buffer-improvements>>, Feb. 2018, 30 pages.

"What's been wrought using the Piece Table?", retrieved from <<https://web.archive.org/web/20160308183811/http://1017.songtrellisopml.com/whatsbeenwroughtusingpiecetables>>, Mar. 8, 2016, 8 pages.

"Red-black tree", retrieved from <<https://en.wikipedia.org/wiki/Red%E2%80%93black_tree>>, May 20, 2018, 22 pages.

"IntelliJ IDEA", retrieved from <<https://en.wikipedia.org/wiki/IntelliJ_IDEA>>, Jun. 18, 2018, 7 pages.

"Eclipse (software)", retrieved from <<https://en.wikipedia.org/wiki/Eclipse_(software)>>, Jun. 18, 2018, 10 pages.

"Atom (text editor)", retrieved from <<https://en.wikipedia.org/wiki/Atom_(text_editor)>>, Jun. 22, 2018, 4 pages.

"Text editor", retrieved from <<https://en.wikipedia.org/wiki/Text_editor>>, Jun. 29, 2018, 6 pages.

"Data buffer", retrieved from <<https://en.wikipedia.org/wiki/Data_buffer>>, Mar. 16, 2018, 4 pages.

"Data structure", retrieved from <<https://en.wikipedia.org/wiki/Data_structure>>, Jun. 19, 2018, 5 pages.

"Ed (text editor)", retrieved from <<https://en.wikipedia.org/wiki/Ed_(text_editor)>>, Jun. 30, 2018, 4 pages.

"Word processor (electronic device)", retrieved from <<https://en.wikipedia.org/wiki/Word_processor_electronic_device)>>, May 20, 2018, 7 pages.

"Bravo (software)", retrieved from <<https://en.wikipedia.org/wiki/Bravo_(software)>>, Mar. 8, 2018, 3 pages.

"Microsoft Word", retrieved from <<https://en.wikipedia.org/wiki/Microsoft_Word>>, Jun. 25, 2018, 11pages.

Charles Crowley, "Data Structures for Text Sequences", retrieved from <<http://www.cs.unm.edu/~crowley/papers/sds.pdf>>, Jun. 10, 1998, 29 pages.

"JavaScript", retrieved from <<https://en.wikipedia.org/wiki/JavaScript>>, Jul. 5, 2018, 19 pages.

* cited by examiner

TEXT EDITOR BUFFERING IMPLEMENTATION WITH OFFSETS MANAGEMENT

BACKGROUND

A text editor is a kind of computer program that people can use to manually edit text. Editing can also be at least partially automated in some text editors, using scripts or macros. The text being edited may be plain text with no formatting for boldface, italics, and other visual enhancements, or the text may include such formatting. The term "text" is used broadly herein to mean written expression. The text may be computer program source code, a screenplay, a legal brief, a patent application, a news report, a letter, a business report, a mathematics proof, or any other content that can be expressed in one or more written languages. The written language may be a natural language such as English or Chinese or any other natural language, or it may include a computer programming language, mathematical notation, musical notation, or another set of symbols for written expression, or a combination of individual languages.

Some common text editing operations include appending or prepending a string of text at one end of another string of text, inserting a string of text into another string of text, deleting some or all of a string of text, searching a string of text for a specified substring of symbols, searching for a substring and replacing it with a different (possibly empty) substring, cutting (i.e., deleting) a substring from one location and pasting (i.e., inserting) it at another location, reading text into the editor from a file, displaying text, and saving edited text to a file, which in some cases is the file that an earlier version of the text was read from, and in other cases is not. However, different text editors offer a wide range of different editing operations, and some editors provide specialized operations for particular kinds of text, such as source code or screenplays. Moreover, some may be standalone editors while others are part of another program, such as an email program or a slide editing and presentation tool.

When it is subject to editing, text is represented in a computer's working memory. Working memory is the random access memory (RAM) used by operating systems and application programs to hold data structures and other program data and program code while the operating systems and application programs are in use. The text editor working memory that holds data structures representing text is sometimes referred to as a "buffer" or "text buffer", with the understanding that the word "buffer" is also used in other contexts to represent different uses of memory, e.g., to compensate for different data transmission rates in a peripheral device or a network device. Data structure choices, operating system constraints, and hardware constraints may each limit the amount of text that can be held in whatever text buffer memory is available at a given time.

Different data structures may prove to be more efficient for particular text editing operations, in that they use less memory or require fewer processor cycles than other data structures. At least in theory, some data structures may also provide capabilities that others lack, such as an ability to undo and redo editing operations. However, an extremely large number of different data structures can be devised by combining components such as arrays, structs, unions, records, objects, pointers, bitmaps, classes, and data types. In practice, a given data structure might or might not be well-suited (or even prove feasible) as part of an implementation for one or more particular text editing operations.

SUMMARY

Some teachings herein are motivated by the technical challenge of improving text editor performance for large files, and in particular the challenge of reducing the time required to load for editing a text file that is 2 MB (two megabytes) or larger on disk. Another motivating technical challenge is reducing the amount of working memory consumed by text editor data structures, especially when the data structure represents hundreds of thousands of lines of source code text.

In some embodiments designed for text editor data buffering storage and retrieval, a human-readable display is configured with a listing which depicts text-as-edited. Text buffering structure configuring code configures a portion of a computer memory according to an enhanced piece tree data structure. The enhanced piece tree data structure includes one or more string buffers, and also includes a tree having at least two nodes. The string buffers are external to the tree. Each node includes a substring identifier which identifies a substring stored in one of the string buffers. The enhanced piece tree data structure is enhanced beyond a mere piece tree data structure in that it also includes multiple text item offsets which specify respective locations of text item instances in strings that are stored in the string buffers; text items may be line starts or parentheses or capitalized letters, for example. Text buffering structure traversing code traverses the enhanced piece tree data structure, reads from one or more of the string buffers, and produces the listing of text-as-edited. The listing is based on one or more text edits that are represented by at least some of the nodes, and the listing shows a result of performing the text edits on one or more strings that are stored in the string buffers.

In some embodiments, buffering of data is accomplished by configuring a portion of a computer memory according to an enhanced piece tree data structure. This includes configuring a tree having at least two nodes; configuring at least two string buffers; identifying in each node by string extent values a substring that is stored in one of the string buffers; specifying, by multiple text item offsets, respective locations of text item instances in strings that are stored in the string buffers; and representing a text edit using at least two of the nodes. Some embodiments produce a listing which shows a result of performing a plurality of text edits which are represented by the nodes. Listing production is accomplished by traversing the tree and reading from the string buffers, and the listing can be displayed in human-readable form.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
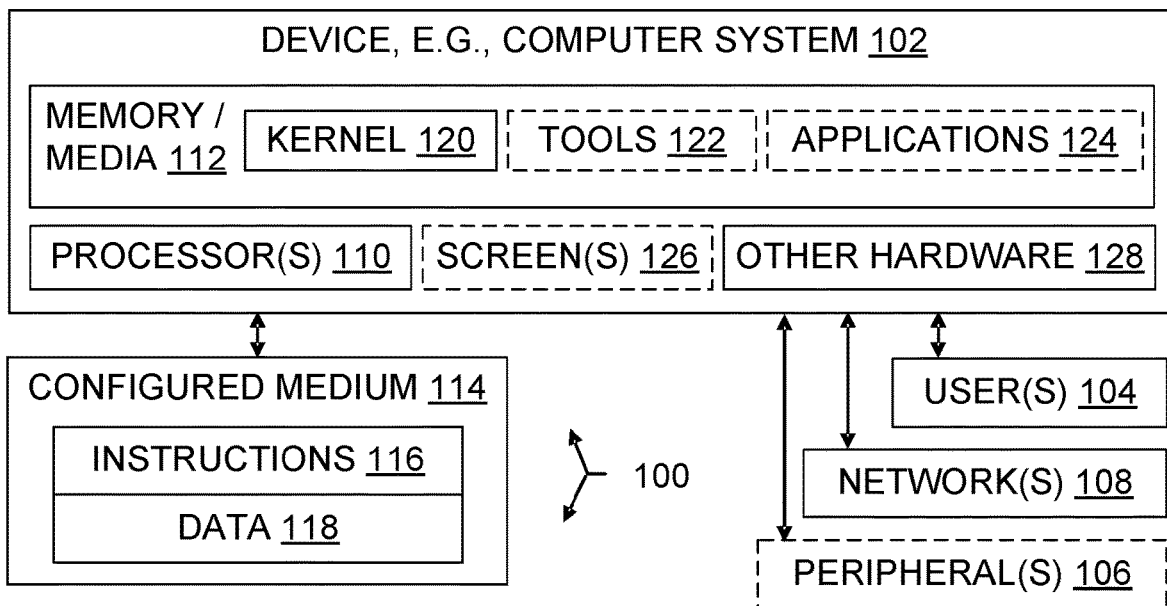
FIG. 1 is a block diagram illustrating a computer system and also illustrating a configured storage medium.
Figure 2:
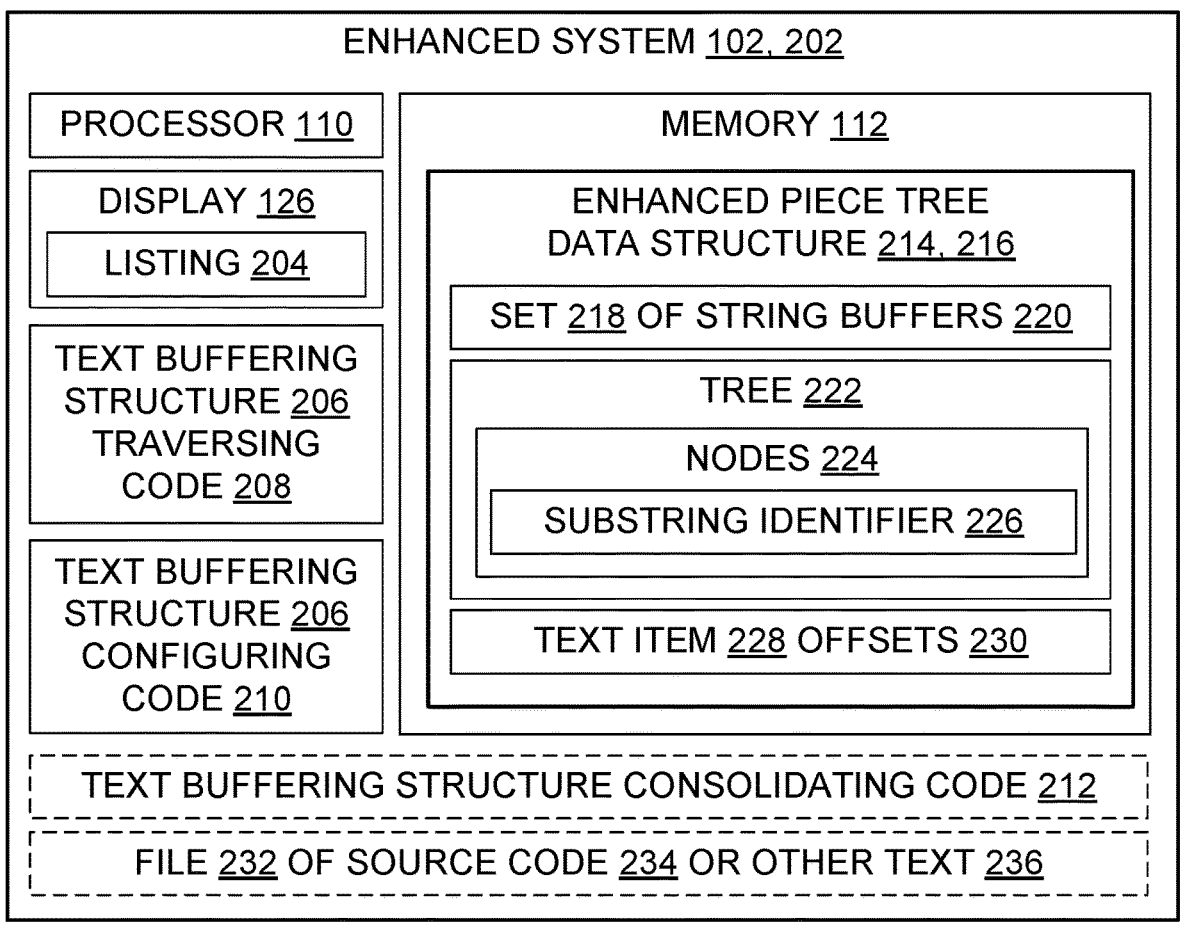
FIG. 2 is a block diagram illustrating aspects of a computer system which is enhanced for more efficient text buffering.
Figure 3:
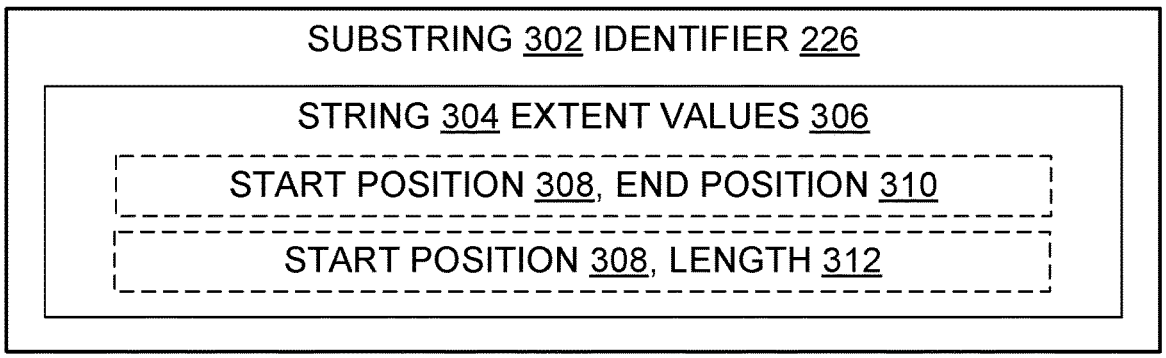
FIG. 3 is a block diagram illustrating a substring identifier.
Figure 4:
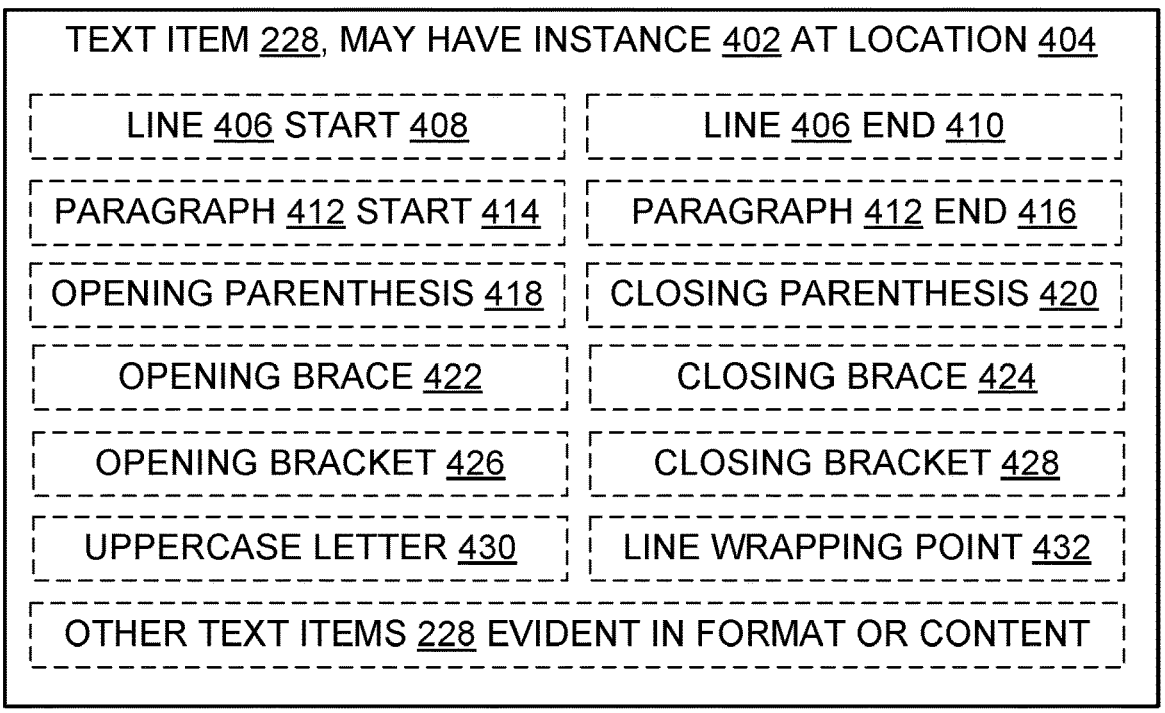
FIG. 4 is a block diagram illustrating text items.
Figure 5:
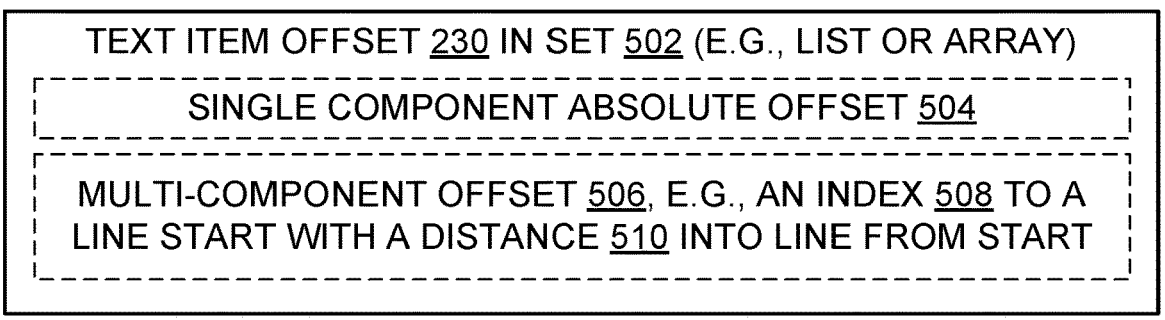
FIG. 5 is a block diagram illustrating a text item offset.

Text editors were among the earliest software tools created. Along with an assembler and a shell, the ed text editor was one of the first three parts of the Unix operating system environment developed by Ken Thompson in 1969. Text creation is not limited to writing software, of course, and word processing was one of the earliest applications for the personal computer. The first what-you-see-is-what-you-get (WYSIWYG) word processor was Bravo, produced in 1974 by Charles Simonyi and others at Xerox PARC. Simonyi went on to help develop the first version of Microsoft Word software, released in 1983. Word processing was the most widely used application on personal computers prior to the rise of the World Wide Web in the mid-1990s.

Over time, the data structures used in word processors and other text editors have been varied. One data structure for text editing is a simple array of lines, also referred to herein as an "array-of-lines" with hyphens in the name. In this data structure, each element in an array points to or otherwise effectively holds a string which represents one line of text. Lines are typically delimited by one or more special characters, such as carriage return or line feed or both. One of skill recognizes that although linked lists and arrays are not identical, in many cases one can be substituted for the other. One of skill also recognizes that arrays and linked lists resemble one another more closely than either of them resembles a tree, for example. Thus, in some alternative implementations an array-of-lines data structure (as that nomenclature is used herein) actually includes the elements containing respective lines in a linked list rather than including those elements in an array.

Another data structure used in some text editors is a piece table. Note the word "table", because data structures presented herein include a piece tree, as opposed to a piece table. A piece table uses a table to help represent edited text as a sequence of "pieces" of text which come either from a file as originally loaded into the editor or from a file of added text resulting from text edits. Being a table, the piece table has columns and rows. As text edits occur, rows are added to the piece table to help represent the edits. By contrast, a piece tree uses a tree to help represent edited text. Text edits are represented using tree nodes and are implemented by operations such as splitting a node to form two nodes, inserting a node between two other nodes, and altering string extent values in a node. An enhanced piece tree departs further from the piece table by tracking text item offsets, such as line starts, using the tree nodes, or by tracking text item offsets using a data structure that is functionally integrated with the tree, e.g., by being pointed to from within one or more nodes of the tree.

As explained in greater detail in the Text Buffer Reimplementation section below, the present inventors faced and successfully addressed the problem of identifying technical innovations that would allow a source code editor to open large files (greater than 2 MB) in an acceptable short time. "Opening" or "loading" a file is the time it takes until the editor is functional with respect to the file's content, e.g., the point at which the user can jump to the last line of the text, or search the text, or make edits. A goal pursued and met was that files up to 100 MB in size should be perceived as opening immediately, that is, fast enough to avoid change requests or feature requests or service tickets being submitted by editor users on the ground that the file opens too slowly. Larger files such as a 2 GB file may take up to 30 s (thirty seconds) to open, which is still much faster than competing implementations.

In response, the inventors created a family of data structures that is fast to create, is optimized for line-based read access, and is reasonably fast to update. The data structures were chosen by ruling out a vast number of possible data structures, and ultimately by combining new ideas with some ideas from piece tables and red-black trees. Some family members include an array of fixed-sized read-only text buffers, a small number of append-only text buffers, and a red-black tree to manage the metadata of how to combine snippets (i.e., substrings) from those text buffers into the actual text they should represent as well as information about where line breaks are located. Line start/end location information allows for rapid line-based access. These aspects are described herein, as are many other aspects of innovate text buffering.

Some embodiments described herein may be viewed by some people in a broader context. For instance, concepts such as buffering, editing, offsets, strings, and trees, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce memory usage by editable text or speed file loading into a text editor. Other configured storage media, systems, and methods involving buffering, editing, offsets, strings, or trees are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping those systems make more efficient use of memory, of processing cycles, or both, with regard to text editing operations.

Technical effects provided by some embodiments include a more efficient family of text buffering data structures, and an understanding of tradeoffs between those efficiencies and relatively larger or smaller numbers of text edits.

Some embodiments include technical adaptations such as a family of piece trees, and text item offset tracking enhancements of the piece trees.

Other advantages based on the technical characteristics of the teachings will also be apparent to one of skill from the description provided.

Acronyms and abbreviations

Some acronyms and abbreviations are defined below. Others may be defined elsewhere herein or require no definition to be understood by one of skill.

ALU: arithmetic and logic unit
API: application program interface
BIOS: basic input/output system
CD: compact disc
CPU: central processing unit
DOM: document object model
DVD: digital versatile disk or digital video disc
FPGA: field-programmable gate array
FPU: floating point processing unit
GB: gigabyte
GPU: graphical processing unit
n GUI: graphical user interface
MB: megabyte
OS: operating system
RAM: random access memory
ROM: read only memory
VS Code: Visual Studio® Code program (mark of Microsoft Corp.)
V8: JavaScript® engine, also known as Chrome V8 (mark of Oracle)

Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

A set of one or more symbols in a text is called a "string". A string which forms at least part of a string is called a "substring". Each string is a substring of itself; a substring which does not include the entirety of the string that forms its context is called a "proper substring".

Unless indicated otherwise, strings and data structures are in working memory, and "memory" refers to working memory. One indication that strings or data structures are on disk or otherwise not in working memory is reference in the relevant discussion to a file, e.g., piece trees may be saved to a file from working memory and read later from that file back into working memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as allocating a buffer in working memory, reading text from a file or from working memory, writing text to a file or to working memory, splitting or inserting nodes, and manipulating a data structure in any way, are understood herein as inherently digital. A human mind cannot interface directly with a CPU or other processor, or with RAM or other digital storage, to read and write the necessary data to perform the text buffering steps taught herein, or to create the piece tree data structures and buffer management taught herein. This would be well understood by persons of skill in the art in view of the present disclosure, but others may sometimes need to be informed or reminded of the facts. Unless stated otherwise, embodiments are also presumed to be capable of operating at scale (i.e., one thousand or more primary users) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

A "cloud" or "cloud network" is a network accessible through the internet or through an institutional or enterprise or governmental network, which provides compute, storage, and network capabilities to one or more entities on demand from pooled resources, with elasticity and measured service usage. Unless stated otherwise, any discussion of reading from a file or writing to a file includes reading/writing a local file or reading/writing over a network, which may be a cloud network or other network, or doing both (local and network read/write).

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as buffering, communicating, configuring, consolidating, creating, cutting, deleting, displaying, editing, executing, identifying, inserting, listing, modifying, omitting, pasting, producing, redoing, replacing, representing, searching, saving, specifying, splitting, storing, traversing, undoing, using, utilizing (and buffers, buffered, communicates, communicated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users
106 peripherals
108 network generally
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, device drivers
122 tools, e.g., anti-virus software, firewalls, packet sniffer software, intrusion detection systems (IDS), intrusion prevention systems (IPS), software development tools, diagnostics
124 applications, e.g., word processors, web browsers, spreadsheets, games, email tools,
126 display screens, also referred to as "displays"
128 computing hardware not otherwise associated with a reference number 106, 108, 110, 112, 114
202 system with an enhanced piece tree data structure for text buffering
204 listing of text as edited, also referred to as "text-as-edited" or "edited text"
206 text buffering structure, e.g., tree portion of piece tree, string buffers portion of piece tree, not-enhanced piece tree, or enhanced piece tree
208 text buffering structure traversing code
210 text buffering structure configuring code
212 text buffering structure consolidating code
214 piece tree data structure generally; if "enhanced" is not expressly indicated, then not-enhanced is presumed but 214 includes both enhanced and not-enhanced piece trees
216 an enhanced piece tree data structure; includes identification of text item locations, which is not present in a not-enhanced piece tree
218 set of string buffers
220 string buffer
222 tree portion of a piece tree data structure
224 node in a tree 222
226 substring identifier
228 text item
230 text item offset
232 file
234 source code
236 text generally
302 substring
304 string
306 string extent value(s); since a substring is a string, 306 also refers to substring extent value(s)
308 string start position; since a substring is a string, 308 also refers to substring start position
310 string end position; since a substring is a string, 310 also refers to substring end position
312 string length; since a substring is a string, 312 also refers to substring length
402 instance of a text item
404 location of instance of a text item
406 line of text
408 start of line of text
410 end of line of text
412 paragraph of text
414 start of paragraph of text
416 end of paragraph of text 418 opening parenthesis, i.e., "("
420 closing parenthesis, i.e., ")"
422 opening brace, i.e., "{"
424 closing brace, i.e., "}"
426 opening bracket, i.e., "["
428 closing bracket, i.e., "]"
430 uppercase letter
432 line wrapping point
502 set of one or more text item offsets
504 single component absolute text item offset, i.e., single value indicating location of text item relative to the start of the listing
506 multi-component absolute text item offset which uses multiple values to indicate location of text item in listing
508 index to a line start
510 distance from line start
1500 flowchart illustrating text buffer configuring method, method
1502 configure a tree
1504 configure string buffers
1506 identify substring
1508 specify location of text item instance
1510 represent a text edit
1512 perform a change in a text buffering structure
1514 insert a substring into a text buffering structure
1516 split a node into two nodes
1518 allocate, set values, insert a new node
1520 identify a substring
1522 delete a substring from a text buffering structure
1524 modify substring extent values to omit the substring from a listing
1526 reconfigure an existing text buffering structure
1600 flowchart, method
1602 perform a text edit operation
1604 text edit operation; also referred to simply as "text edit"
1606 save listing and/or text buffering structure to non-volatile storage, e.g., to a file
1608 read listing and/or text buffering structure from nonvolatile storage, e.g., from a file
1610 perform operation on a buffer-by-buffer basis
1612 search and replace a substring
1614 implement code, e.g., text buffering structure traversing code 208, text buffering structure configuring code 210, text buffering structure consolidating code 212
1616 compiled code; also refers to programming language in which source code of compiled code is written
1618 interpreted code; also refers to programming language in which interpreted code is written
1620 execute code
1622 exceed performance of an array-of-lines text buffering structure
1624 use less memory
1626 populate string buffers and related structures faster
1628 allow user to edit text while text save to file is underway
1630 create an additional copy of tree nodes in working memory
1632 avoid creating an additional copy of text in working memory
1634 use less memory to perform a cut-and-paste
1636 utilize a piece tree text buffering structure
1638 avoid using a piece table text buffering structure
1640 traverse a tree, i.e., visit tree nodes in a specified order
1642 produce a text listing from a text buffering structure
1644 show the results of text edits, e.g., deletions, insertions, replacements
1646 specify text item locations
1648 avoid placing text item offsets directly in tree nodes
1650 display a listing of text-as-edited Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104. End-users may be adults or minors. Automated agents, scripts, playback software, and the like acting on behalf of one or more people may also be users 104, e.g., to facilitate testing a system 102, but end-users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

With particular reference to FIGS. 2 through 5, some embodiments use or provide a text editor data buffering storage and retrieval system 202 for a computer memory. In some examples, the system includes a processor 110, a memory 112 in operable communication with the processor, and a human-readable display 126 which can be configured with a listing of text-as-edited.

A text buffering structure configuring code 210 is present in these examples. Upon execution with the processor, the code 210 configures a portion of the computer memory 112 according to an enhanced piece tree data structure 216. The enhanced piece tree data structure includes at least two string buffers 220. The enhanced piece tree data structure also includes a tree 222 having at least two nodes 224. The string buffers are external to the tree. Each node 224 includes a substring identifier 226 which identifies a substring 302 that is stored in one of the string buffers 220. The enhanced piece tree data structure 216 also includes one or more text item offsets 230 which specify respective locations 404 of text item instances 402 in strings 304 that are stored in the string buffers.

A text buffering structure traversing code 208 is also present in these examples. Upon execution with the processor, the code 208 traverses the enhanced piece tree data structure, reads from one or more of the string buffers, and produces the listing 204 of text-as-edited. The listing 204 is based on one or more text edits that are represented by at least some of the nodes, and the listing shows a result of performing the text edits on one or more strings that are stored in the string buffers.

In some embodiments, at least one of the nodes identifies the substring by specifying a start position 308 of the substring in one of the string buffers and also specifying an end position 310 of the substring in that string buffer.

In some embodiments, a text item offset 230 specifies a location 404 of an instance 402 of one of the following text items in a string stored in one of the string buffers: a line start 408, a line end 410, a paragraph start 414, a paragraph end 416, an opening parenthesis 418, a closing parenthesis 420, an opening brace 422, a closing brace 424, an opening bracket 426, a closing bracket 428, an uppercase letter 430, or a line wrapping point 432.

In some embodiments, an offset 230 of a text item 228 is represented as an absolute offset 504 with a single value. In other embodiments, an offset 230 of a text item c is represented in the enhanced piece tree data structure by using a variable denoted here as j combined with a variable denoted here as d, where j is an index 508 into a list or array of line start positions, and d is a distance 510 in characters from the line start position identified by j to the location of c in a line corresponding to j.

In some embodiments, the enhanced piece tree data structure 216 includes a list or array which contains or points to at least two of the string buffers 220.

In some embodiments, the tree 222 is a balanced binary tree. In some, it is a red-black tree, which is a particular kind of balanced binary tree.

In some embodiments, the system 202 includes text buffering structure consolidating code 212. Upon execution with the processor 110, the code 212 reconfigures the memory by consolidating nodes, thereby reducing the number of nodes. For example, two nodes that represent substrings that are adjacent in the listing can be consolidated into a single node representing the concatenation of the substrings, when the text is saved to a file and the editor is closed, or when editing history represented by the presence of the two nodes is no longer kept.

In some embodiments, the enhanced piece tree data structure 216 includes the multiple text item offsets 230 in an offsets list or array which is external to the nodes 224. This helps the system 202 avoid post-edit recomputation which would occur if text item offsets were instead stored in one or more nodes.

Other system embodiments are also described herein, either directly or derivable as system versions of described methods or configured media, informed by the extension discussion herein of computing hardware.

Methods

Figure 15:
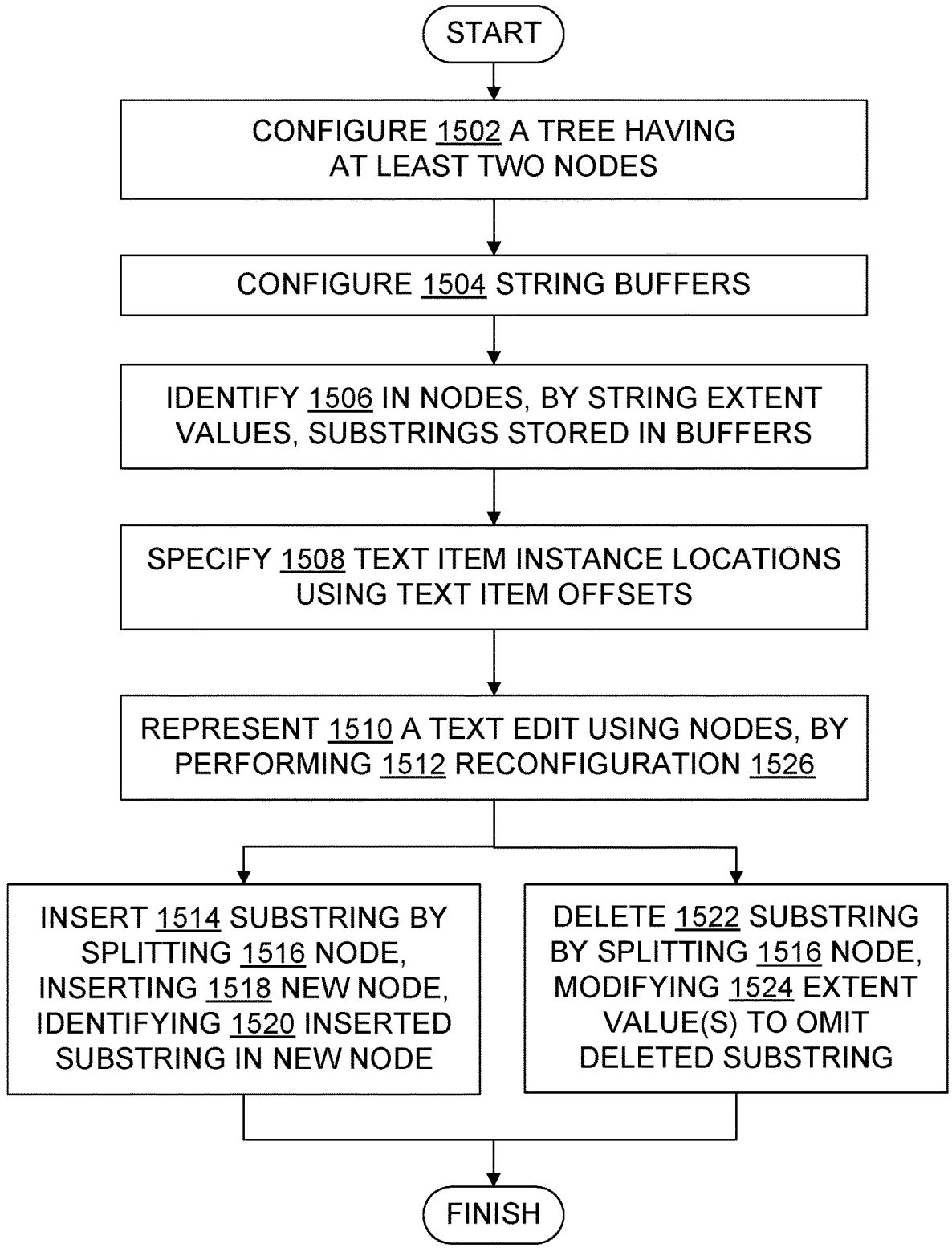
FIG. 15 is a flowchart illustrating example text buffer configuring methods.
Figure 16:
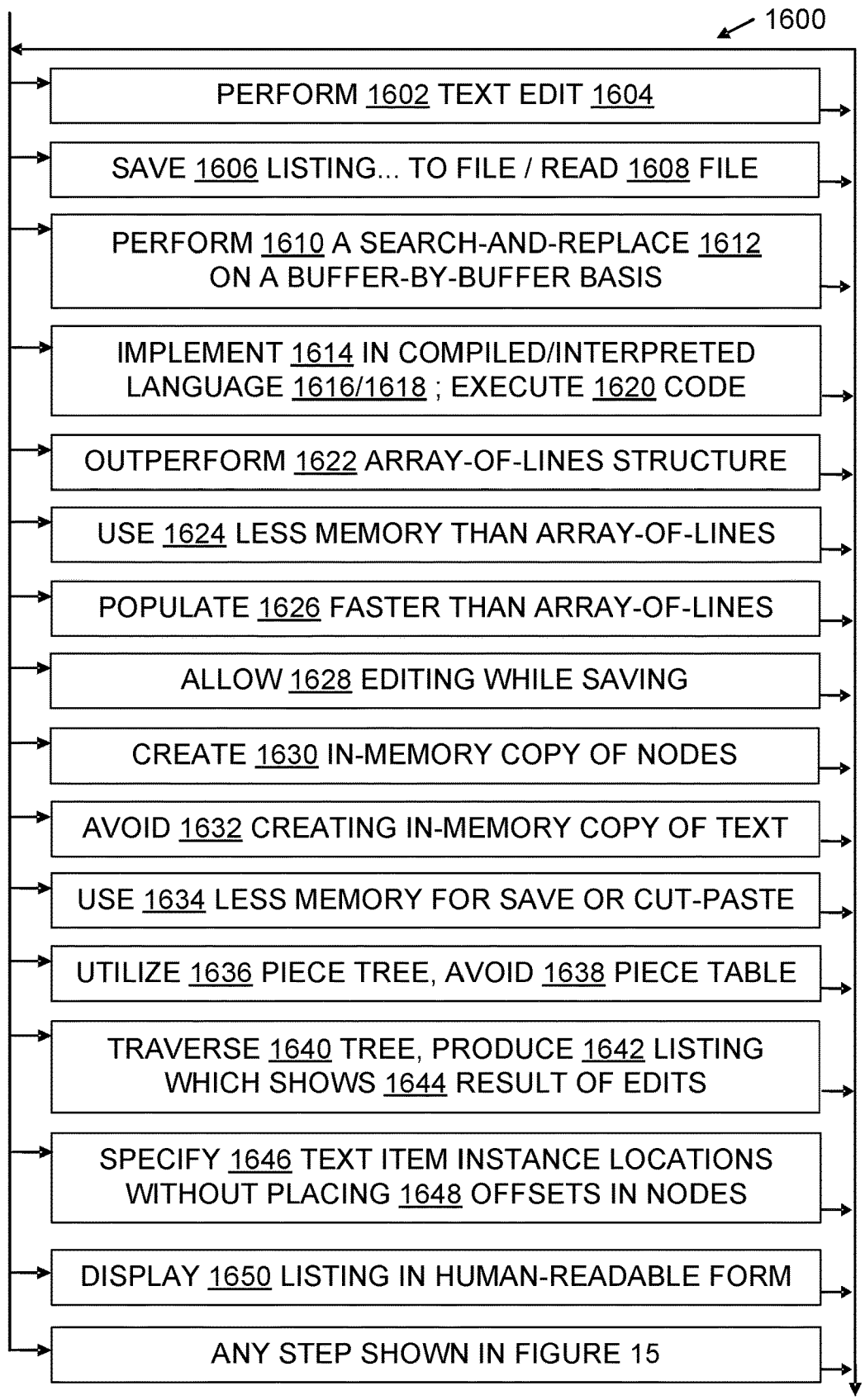
FIG. 16 is a flowchart further illustrating steps in some text buffering methods.

With particular reference to FIGS. 15 and 16, some embodiments use or provide a method which is suitable for use in a text editor 124 for buffering data 118 by configuring a portion of a computer memory 112 according to an enhanced piece tree data structure 216. In some examples, the method 1500 includes configuring 1502 a tree having at least two nodes, and configuring 1504 at least two string buffers. Configuring part or all of a data structure includes allocating memory to hold the data structure and initializing any indexes or pointers which connect or correspond parts of the data structure to one another. Configuring also includes populating the data structure with data such as user-generated text or text from a file, unless the populating act is called out as a separate act.

In these examples, the method also includes identifying 1506 in each node 224 by string extent values 306 a substring 302 that is stored in one of the string buffers 220; specifying 1508, by multiple text item offsets 230, respective locations 404 of text item instances 402 in strings 304 that are stored in the string buffers; and representing 1510 a text edit using at least two of the nodes 224. Such representation may include performing 1512 at least one reconfiguration 1526 of the enhanced piece tree data structure. For example, when the edit inserts 1514 one or more characters into one or more substrings, reconfiguration includes splitting 1516 a node into two nodes, inserting 1518 a new node between the two nodes, and identifying 1520 the one or more inserted characters using the new node. When the edit deletes 1522 one or more characters of a substring, reconfiguration includes splitting 1516 a node into two nodes and modifying 1524 string extent values to omit the one or more deleted characters.

In some embodiments, the method also includes outperforming 1622 an array-of-lines data structure. This may be achieved, for example, by using 1624 less memory in the enhanced piece tree data structure to hold a listing. Some embodiments use 1624 less memory to hold a listing that has at least five hundred thousand lines than is used to hold the listing in the array-of-lines data structure, for example. Better performance 1622 may also, or instead, include populating 1626 the enhanced piece tree data structure with a listing faster than the array-of-lines data structure is populated with the listing. Some embodiments populate faster when the listing has at least five hundred thousand lines, for example.

In some embodiments, the method also includes performing 1610 a search-and-replace operation 1612 on a buffer-by-buffer basis, instead of a line-by-line basis.

In many if not all embodiments, the nodes 224 will represent one or more text edits performed on one or more strings that are stored in the string buffers, and a listing 204 is a result of performing all of the text edits represented by the nodes.

In some embodiments, the method further includes saving 1606 to a file 232 a complete copy of the listing while allowing 1628 further text edits to be performed during the saving. In some of these, the saving includes creating 1630 a copy of the nodes in memory and the saving avoids 1632 creating a complete copy of the listing in memory. This reduces 1634 the amount of memory which is used to perform file saving while continuing to allow file editing.

For example, under a different earlier approach, when a user tries to save the content to a local disk, the editor makes a complete copy of the text buffer so that user edits will not affect the content saving. For example, suppose the user is working on a 10 MB file, and the user presses Ctrl+S or otherwise commands the editor to save the content, and then immediately deletes half of the content. The earlier approach created a copy for the original content, while running disk saving in another thread so users could continue to make edits to the file in memory. So while the file save is still running, there will be two text buffers: the first one is the copy which is 10 MB, and the second is the latest content, which is 5 MB (user deleted half of the content). With a newer and better approach, all piece tree string buffers are either Readonly, or AppendOnly (the editor code only adds new content to the end of buffers). Accordingly, when a user triggers a Save File, the editor only has to create copies of piece tree nodes, which hold Start and End positions into a string buffer, instead of creating a complete copy of the listing in memory. In this way, the memory usage while doing file saving is close to 10 MB, instead of about 15 MB (10 MB text to save in file+5 MB edited text).

In some embodiments, a selection (a particular substring chosen to be an object of an edit operation) is at least a portion of the listing, and the method further includes cutting and pasting a selection in the text editor. In some of these, the cutting and pasting includes creating 1630 a copy of the nodes in memory and the cutting and pasting avoids 1632 creating a complete copy of the selection in memory. This reduces 1634 the amount of memory which is used to perform cutting and pasting within the text editor.

Some embodiments include traversing 1640 the tree 222, and reading from one or more of the string buffers 220 and concatenating the strings read, thereby producing 1642 a listing which shows 1644 a result of performing text edits that are represented by the nodes.

In some embodiments, specifying 1646 locations 404 of text item instances 402 in strings that are stored in the string buffers includes specifying line break locations or line start locations or both without 1648 placing either line break offsets or line start offsets in the nodes.

Technical methods shown in the Figures or otherwise disclosed will be performed automatically, e.g., by a text editor process executing on a computer system, unless otherwise indicated. Methods may also be performed in part automatically and in part manually to the extent action by a human administrator or other human person is implicated, e.g., by selecting code to cut and paste, or typing characters to insert, or commanding the editor to save a copy of the text into a file. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 15 and 16. Steps may be performed serially, in a partially overlapping manner, or fully in parallel. In particular, the order in which flowchart 1600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as piece trees 214, enhanced piece trees 216, traversing code 208, configuring code 210, consolidating code 212, and listings 204, in the form of data 118 and instructions 116, read from a removable storage medium 114 and/or another source such as a network connection, to form a configured storage medium. The configured storage medium 112 is capable of causing a computer system to perform technical process steps for text buffering and editing operations, as disclosed herein. The Figures thus help illustrate configured storage media embodiments and process embodiments, as well as system and process embodiments. In particular, any of the process steps illustrated in FIG. 15 or 16, or otherwise taught herein, may be used to help configure a storage medium to form a configured storage medium embodiment.

Some embodiments use or provide a computer-readable storage medium 112 configured with executable code for performing a method for configuring a portion of a computer memory according to a piece tree data structure, the method including: configuring 1502 a balanced tree 222 having at least two nodes 224; configuring 1504 at least two string buffers 220 external to the nodes; identifying 1506 in each node by string extent values 306 a substring that is stored in one of the string buffers; producing 1642 a listing 204 which shows a result of performing a plurality of text edits which are represented by the nodes, the producing including traversing 1640 the tree and reading from the string buffers; and displaying 1650 the listing in human-readable form on a computing system display 126.

In some embodiments, the method further includes specifying 1508, by multiple text item offsets 230, respective locations 404 of text item instances 402 in strings that are stored in the string buffers 220. The displayed listing is based at least in part on one or more of the text item instances, e.g., if a text item is a line end/break or a line start, the text listing displayed accordingly shows text on different lines.

In some embodiments, the executable code 208, 210 is written at least partially in an interpreted programming language 1618 and during the execution 1620 of that code by a processor the processor spends less than ten percent of its processor cycles executing compiled code. In some, the executable code 208, 210 is written at least partially in a compiled programming language 1616 and during the execution 1620 of that code by a processor the processor spends more than sixty percent of its processor cycles executing compiled code.

In some embodiments, the method further includes reading 1608 from a file which contains computer program source code 234. The method configures 1502, 1504 the tree and the string buffers for displaying 1650 the source code and for editing 1604 of the source code. In particular, the method specifies 1508 source code line starts or source code line breaks (a.k.a. line ends) or both as text item instances 402 using text item offsets.

In many if not all embodiments, the method utilizes 1636 a piece tree data structure 214 to hold text in memory during editing and avoids 1638 utilizing a piece table data structure to hold text in memory during editing.

Detailed Examples of Piece Tree in Operation

In some implementations, the piece tree data structure includes two string buffers 220. One buffer is for the original content (e.g., content loaded from a file 232 on disk) and one buffer for substrings added by user edits. However, multiple buffers can be used in either role. The original content may be loaded in chunks, for example, into multiple original buffers. The added content may likewise be stored in multiple add buffers. In the FIG. 6 example, buffers 0 and 1 are original buffers, and buffer 2 is an add buffer.

One implementation loads content from a local disk by chunks in sequence and the maximum size of a chunk in this implementation's environment is 64 KB. String buffers for user edits are created only when users make edits, so if a user opens a file in the editor and the file is small (<64 KB or whatever the chunk size is), there is one string buffer in the piece tree. If there have been no user edits, there will only be one node which identifies a substring of the only buffer. But if one loads a 64 MB file, this implementation will receive 1000 chunks in sequence. Although merging these 1000 chunks into a single string might be possible, to store it in a piece table in one original buffer, that would be costly. Instead these 1000 chunks are stored in individual buffers, leading to 1000 buffers in the piece tree data structure. One advantage of using an array of chunk buffers is that buffers may be sized to match the chunk size utilized by a storage medium or storage device driver, so that a contiguous section of memory much larger than the chunk size is not allocated to hold the initial contents of the file. Similarly, some implementations store user edits in separate buffers (e.g., as strings in JavaScript® code) so the original content (a list of buffers) is always unaltered by the loading process that populates the piece tree.

Figure 6:
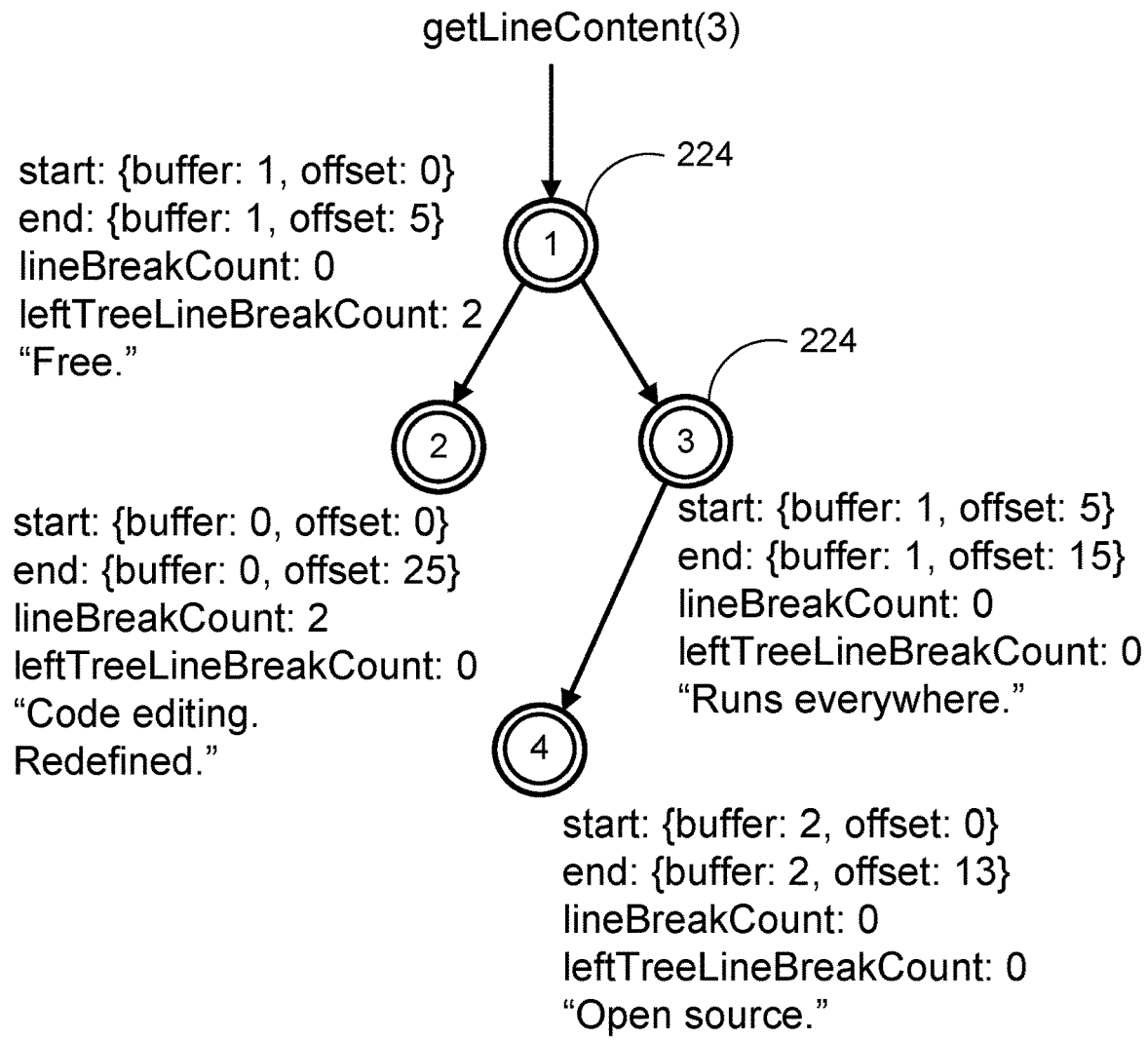
FIG. 6 is a diagram illustrating an example of an enhanced piece tree data structure and a corresponding listing.

FIG. 6 illustrates piece tree data structure values at a point in time (snapshot), including a piece tree 214 with populated buffers 220 and a populated binary tree 222. The binary tree nodes 224 are numbered 1 through 4 for convenient node identification only; the numbering does not necessarily reflect node traversal order. Indeed, in-order traversal 1640 to produce 1642 the illustrated listing with read buffer content as indicated from nodes 2, 1, 4, 3 in that order. Also, for convenience the substrings represented by nodes are shown in FIG. 6 next to the start, end, and break count values stored in the nodes, but in an actual implementation the substrings are stored in the buffers, not in the nodes, as illustrated by source code examples herein.

The following is presented as an illustration of how the getLineContent(3) subtree is traversed to produce line 3 of the listing, and more generally, of tree traversal to produce the edited listing for display to a user when a balanced binary tree is used. Assume the editor piece tree has three buffers and four nodes, as shown in FIG. 6 with the caveats noted above, e.g., as to node identification and string storage location. As indicated a balanced tree is used to store all nodes. The left children of a tree node represent the text content before the node, and the right child of a tree node has content after the node. So the whole document's content (i.e., listing) can be represented generally in a recursive manner as:

contentOf(rootNode.left)+contentOf(rootNode)+contentOf(rootNode.right)

or in the case of the FIG. 6 example as:

contentOf(node2)+contentOf(node1)+contentOf(node4)+contentOf(node3)

where "+" indicates string concatenation.

Additional information stored in each node includes lineBreakCount, the amount of line breaks in the content which the node represents, and leftTreeLineBreakCount, the amount of line breaks in the left child tree.

The 1$^{st}$ node, which is the root of this tree, represents content "Free ." and has no line breaks inside the content. The 2$^{nd}$ node, which is the left child of the root, represents content "Code editing. \nRedefined. \n" and contains two line breaks. Every time the editor's traversing code 208 tries to find the content of a line, it traverses the tree from the root.

The workflow for finding the content of the 1$^{st}$ line will be:
1. Check the root node (Node 1), determine that its left child has 2 line breaks. Since the left child is content before the root, the 1st line is stored in the left child tree.
2. Traverse to the left child (Node 2) of the root node.
3. Node 2 has no left child, so it is the first node. It has 2 line breaks, so the 1$^{st}$ line is stored (conceptually) inside this node. Use the techniques described elsewhere herein to find the content, which is physically stored in buffer(s), albeit conceptually in the node.

The workflow for finding the content for the 3$^{rd}$ line is bit more complex:
1. Check the root node (Node 1), determine that its left child has 2 line breaks. So the left child has the content for the 1$^{st}$ line, and the 2$^{nd}$ line, and probably the beginning of the 3$^{rd}$ line.
2. Traverse to the left child (Node 2) of the root node.
3. Node 2 has no left child, so it is the first node. It has 2 line breaks. Find the offset of the first character of the 3$^{rd}$ line; every character after it (including it) belongs to the 3$^{rd}$ line. Unluckily in this case, the content is an empty string.
4. Go back to Node 2's parent, which is the root node.
5. The root node (Node 1) has no line break, so the content of Node 1 is part of the 3$^{rd}$ line. The content is "Free."
6. Traverse to the right child of the root node, Node 3.
7. Node 3 has a left child, and its left child has no line break, so its left child is part of the 3$^{rd}$ line as well. Traverse to that left child, Node 4.
8. Node 4 has no line break, so its entire content is part of the 3$^{rd}$ line, which is "Open Source."
9. Traverse back to Node 3. It has no line break, so the whole content it represents is part of the 3$^{rd}$ line, which is "Runs everywhere.".
10. Thus, the workflow traverses the whole tree and concatenates the content found during the tree traversal to determine that " "+"Free."+"Open Source."+"Runs everywhere." is the content of the 3$^{rd}$ line.

Text deletion edits are also represented in the piece tree. Deletion in the piece tree involves splitting a tree node into two nodes, which is illustrated by the following example. Suppose there is only one node, and its substring content is "VS Code". The node's data structure may be represented thus, using offset/length instead of BufferPosition to simplify: {buffer: "VS Code", offset: 0, length: 7}. Now suppose the user wants to delete the space between "VS" and "Code". Then the editor will modify this node to {buffer: "VS Code", offset: 0, length: 2} and insert another node as its right child, namely, {buffer: "VS Code", offset: 3, length: 4}. More generally, an insert will turn one node into three nodes (split the original node into two, and then insert a new node between them), and a deletion will split a node into two nodes.

As another illustrative example, consider the following populated buffers 220. As noted elsewhere herein, the wrapping of the original buffer below into three parts on the page is an artifact of Patent Office formatting requirements. The wrapping has no significance as to the operation of the piece tree, and should not be confused with wrapping 432 as a text item 228 in a running implementation:

Original Buffer

| C | o | d | e |   | e | d | i | t | i | n | g | . | \n | R | e | d | e | f | i | n |
|---|---|---|---|---|---|---|---|---|---|---|---|---|----|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 |

| e | d | . |   | \n | F |   | r | e | e | . |   | R | u | n | s |   | e | v | e | r | y |
|---|---|---|---|----|---|---|---|---|---|---|---|---|---|---|---|---|---|---|---|---|---|
| 21 | 22 | 23 |   | 24 | 25 |   | 26 | 27 | 28 | 29 |   | 30 | 31 | 32 | 33 |   | 34 | 35 | 36 | 37 | 38 | 39 | 40 |

|   |   | w |   | h |   | e |   | r |   | e |   | . |
|---|---|---|---|---|---|---|---|---|---|---|---|---|
|   |   | 41 |   | 42 |   | 43 |   | 44 |   | 45 |   | 46 |

Add Buffer

| O | p | e | n |   | s | o | u | r | c | e  |    |    |
|---|---|---|---|---|---|---|---|---|---|----|----|----|
| 0 | 1 | 2 | 3 | 4 | 5 | 6 | 7 | 8 | 9 | 10 | 11 | 12 |

Strings identified in corresponding nodes can be summarized thus:
Original buffer, offset 0, length 31
Add buffer, offset 0, length 13
Original buffer, offset 31, length 16

Class BufferPosition and reduction is object allocation can be illustrated using these three populated nodes and their populated buffers. Suppose the editor wants to know the tenth character in the document. It reads the first node {Orig, offset 0, length 31}. This node's substring is on the original buffer with start offset 0, and the editor can determine from there that the tenth character is n. But what if the editor wants to read the second line in the document? These three nodes don't have any information about line breaks so with this version of the piece tree the editor would go through every character and count line breaks. That workflow would be:

1. Read the first node {Orig, offset 0, length 31}
2. This node's identified substring in on original buffer and the start offset is 0, so the editor reads from the first character. The editor finds a line break \n at offset 13, so it knows the second line is exactly after offset 13 (starting from 14).
3. The editor continues reading characters until it finds another line break at offset 24 (before offset 25).
4. From this, the editor determines that the content between offset 14 and offset 25 is the content of the second line, namely, "Redefined."

Reading line content is one of the most frequent operations in an editor text buffer. If an implementation does not have any cache for line breaks information, it will have to go through a workflow like that above every time, which would be extremely slow. So the editor should have some way to store the information about line breaks in a text buffer.

In the original buffer populated above, there are two line breaks in the text, one at offset 13 and the other one at offset 24. An editor can store them in an array as [13, 24]. However there may be a problem with storing line break positions, depending on the text implementation used for line breaks. A line break may be implemented in some systems as more than one character of text, for instance on some systems the line break is usually two characters \r\n. So instead of storing the offset/position of line breaks, the editor can store the offset/position of the first character of a line. There are three lines in the original buffer above, so the editor stores them in an array as [0, 14, 25].

Now the original buffer is represented as

```
{
    value: "Code editing.\nRedefined.\nFree. Runs everywhere."
    lineStarts: [0, 14, 25]
}
```

Then the next time line breaks are used, when the editor tries to fetch the content of the second line, the workflow becomes simpler:

1. Read the first node {Orig, offset 0, length: 31}
2. It's on the original buffer. The offset of the first character of second line is 14, the offset of the first character of third line is 25.
3. Content between offset 14 and offset 25 is the content of the second line.

In some implementations, every buffer has a lineStarts property, which stores the offset information of first character of each line, e.g., in this example:

1. The offset of character "c" is lineStarts [0].
2. The offset of character "R" is lineStarts [1].
3. The offset of character "F" is lineStarts [2].

Some implementations use this information to represent every character:

| c | -----> | offset is lineStarts[0] + 0 |
| o | -----> | offset is lineStarts[0] + 1 |
| d | -----> | offset is lineStarts[0] + 2 |
| e | -----> | offset is lineStarts[0] + 3 |
| ... | | |
| R | -----> | offset is lineStarts[1] + 0 |
| e | -----> | offset is lineStarts[1] + 1 |
| d | -----> | offset is lineStarts[1] + 2 |
| .... | | |

That is, the offset of a character can be represented as an index in a lineStarts array in combination with a distance between this character and the first character of indexed current line. Accordingly, some implementations include a class BufferPosition to store such offset information:

```
class BufferPosition {
    index: number; // index in lineStarts
    remainder: number; // distance between this character
    and the first character of current line
}
```

In the example, the second line "Redefined." can now be represented as:

```
{
    bufferIndex: 0, // original buffer
    start: { // BufferPosition
        index: 1,
        remainder: 0
    },
    end: { // BufferPosition
        index: 1,
        remainder: 10
    }
}
```

Text Buffer Reimplementation

The following discussion is derived from a description of how data structures and associated algorithms were created for a software development tool known as Visual Studio® Code (mark of Microsoft Corporation). One of skill will recognize in this discussion many teachings which are also described elsewhere herein and which either appear in patent claims or could be claimed. However, as with the other code-specific examples provided herein, it does not follow that every part of this discussion, or any particular details therein, are required to satisfy legal criteria such as enablement, written description, or best mode. Also, embodiments are not limited to the particular programming languages, tool contexts, identifiers, fields, class definitions, or other implementation choices described in this discussion or elsewhere herein.

Performance discussions about JavaScript® programs usually involve a discussion about how much should be implemented in native code (mark of Oracle America, Inc.).

For the VS Code text buffer, internal study suggested that a C++ implementation of the text buffer could lead to significant memory savings, but did not produce hoped-for performance enhancements. Converting strings between a custom native representation and V8's strings is costly, and compromised any performance gained from implementing text buffer operations in C++ using earlier text buffering structures.

One result of not going native was a search for ways to improve JavaScript or TypeScript code. That led to some study of ways to push a JavaScript® engine to its limits and squeeze out as much performance as possible. But even without low level engine tricks, it is possible to improve speed by one or more orders of magnitude by using better suited data structures and faster algorithms for configuring/populating, traversing, and reconfiguring (manipulating) those data structures.

As context, consider a previous text buffer data structure, an array-of-lines. A mental model for a source code editor is line based. Developers read and write source code line by line, compilers provide line/column based diagnostics, stack traces contain line numbers, tokenization engines run line by line, etc. Consistent with this mental model, a previous text buffer implementation powering VS Code used an array of lines, in an editor which had acceptable performance because the typical text documents it was used to edit were relatively small. When the user was typing, the editor located the line to modify in the array and replaced that line. When inserting a new line, the editor spliced a new line object into the line array and the JavaScript® engine did the heavy lifting.

However, reports were received that opening certain files would cause Out-Of-Memory crashes in VS Code. For example, one user failed to open a 35 MB file. The root cause turned out to be that the file had too many lines, 13.7 million. The editor would create a ModelLine object for each line and every object used around 40-60 bytes, so the line array used around 600 MB memory to store the document, which is twenty times the initial file size. Another problem with the line array representation was the speed of opening a file. To construct the array of lines, the editor split the content by line breaks, to get a string object per line. The splitting hurt performance.

The old line array representation can take a lot of time to create and consumes a lot of memory, but it gives fast line look-up. In a perfect hypothetical case, an editor would store only the text of the file and no additional metadata. So a search began for data structures that require less metadata. After reviewing various data structures, one inventor selected a piece table as candidate to start with in creating the improved text buffering structure.

Piece table is a data structure used to represent a series of edits on a text document, as illustrated by the following source code, which is written in TypeScript but could be ported to other programming languages. Piece tables originally kept edit information in rows added to a table, but looking ahead to the piece tree data structure the PieceTable class below refers to "nodes" instead of rows:

```
class PieceTable {
    original: string; // original contents
    added: string; // user added contents
    nodes: Node[ ];
}
class Node {
    type: NodeType;
```

```
    start: number;
    length: number;
}
enum NodeType {
    Original,
    Added
}
```

After the file is initially loaded, the piece table contains the whole file contents in the original field. The added field is empty. There is a single node of type NodeType.Original. When a user types at the end of a file, the editor appends the new content to the added field, and will insert a new node of type NodeType.Added at the end of the node list. Similarly, when a user makes edits in the middle of a node, the editor will split that node and insert a new one as needed.

The initial memory usage of a piece table is close to the size of the document and the memory needed for modifications is proportional to the number of edits and text added. So typically a piece table makes good use of memory. However, a price for low memory usage is that accessing a logical line is slow. For example, if a user wants to get the content of the 1000th line, the only way is for the tool to iterate over every character starting at the beginning of the document, find the first 999 line breaks, and read each character until the next line break.

One improvement is to use caching for faster line lookup. Some traditional piece table nodes only contain offsets, but one can add line break information to make line content lookup faster. An intuitive way to store line break positions is to store the offsets for each line break encountered in a node's text:

```
class PieceTable {
    original: string;
    added: string;
    nodes: Node[ ];
}
class Node {
    type: NodeType;
    start: number;
    length: number;
    lineStarts: number[ ];
}
enum NodeType {
    Original,
    Added
}
```

For example, to access the second line in a given Node instance, the editor can read node.lineStarts [0] and node.lineStarts [1] which will give the relative offsets at which a line begins and ends. Since the editor knows how many line breaks a node has, accessing a random line in the document is straightforward: read each node starting from the first one until the target line break is found. The edit algorithms remain simple, and the text buffering works better than before as one can now jump over entire chunks of text rather than iterate character-by-character. But further improvements are possible.

One challenge is how to avoid a string concatenation trap. The piece table holds two buffers, one for original content loaded from disk, and another for user edits. In VS Code, the editor is loading text files using Node.js fs.readFile that delivers content in 64 KB chunks. So when the file is large, for example 64 MB, the editor will receive 1000 chunks. After having received all of the chunks, the editor can concatenate them into one large string and store it in the original field of the piece table. This sounds reasonable but has problems in practice, due to V8 constraints. Trying to open a 500 MB file caused an exception because in the version of V8 used, the maximum string length is 256 MB. This limit may be lifted, e.g., to 1 GB in future versions of V8, but that doesn't fully solve the problem.

Instead of holding an original and an added buffer, the text buffering structure can hold a list of buffers. One can try to keep that list short or one can be inspired by what is gotten back from fs. readFile and avoid any string concatenation. In this example, each time the editor receives a 64 KB chunk from disk, the editor pushes it directly to the buffers array and creates a node that points to this buffer:

```
class PieceTable {
    buffers: string[ ];
    nodes: Node[ ];
}
class Node {
    bufferIndex: number;
    start: number; // start offset in buffers[bufferIndex]
    length: number;
    lineStarts: number[ ];
}
```

Another improvement is to boost line lookup by using a balanced binary tree. With the string concatenation challenge suitably addressed, the editor can open large files, but this leads to another potential performance issue. Suppose the editor loads a 64 MB file; then the piece table will have 1000 nodes. Even though the editor caches line break positions in every node, it does not know without searching which absolute line number is in which node. To get the content of a line, the editor has to go through all nodes until it finds the node containing that line. In the example case of a 64 MB file loaded in 64 KB chunks, the editor has to iterate through up to 1000 nodes, depending on which line number is sought. Thus, the time complexity of the worst case is O(N), where N is the count of nodes.

Caching the absolute line numbers in each node and using binary search on the list of nodes boosts lookup speed, but whenever the editor modifies a node it has to visit all following nodes to apply the line number delta. This leads to unacceptable performance. However, the idea of binary search is good. To achieve the desired effect, one can leverage a balanced binary tree.

This raises the question of what metadata to use as a key to compare tree nodes. As said, using the node's offset in the document or the absolute line number will bring the time complexity of editing operations to O(N). For a time complexity of O(log n), metadata should be something that's only related to a tree node's subtree. Thus, when a user edits text, the editor recomputes the metadata for the modified nodes, and then bubbles the metadata change along the parent nodes all the way to the root.

If a Node has only four properties (bufferIndex, start, length, lineStarts), it takes seconds to find the result. To get faster, one can also store the text length and the line break count of a node's left subtree. This way searching by offset or line number from the root of the tree can be efficient. Storing metadata of the right subtree can do the same, but the editor needn't cache both.

The classes now look like this:

```
class PieceTable {
    buffers: string[ ];
    rootNode: Node;
}
class Node {
    bufferIndex: number;
    start: number;
    length: number;
    lineStarts: number[ ];
    left_subtree_length: number;
    left_subtree_lfcnt: number;
    left: Node;
    right: Node;
    parent: Node;
}
```

Moving the lineStarts from Node to Buffer will help reduce object allocations and thus improves the speed of the piece tree reconfigurations. To understand why, note first that lineStarts in class Node represents the position/offset of the first character of each line in the substring a node represents. This placement of lineStarts in class Node will add computation cost when there are some user edits. Suppose a user opens a file whose content is "Code editing.\nRedefined.\nFree. Runs everywhere.". This text content is small (e.g., under 64K) and has not been edited in this editor session, so only one buffer is used to store it. The original buffer is shown below, but only the portion occupied by the string is shown. Also, the buffer and content are wrapped on the page in order to meet the format requirements of this patent document. The wrapping is an artifact of those Patent Office formatting requirements; what matters is the correspondence shown between text characters and their position as indicated here by the numbers underneath the characters:

Original Buffer

| C | o | d | e |   | e | d | i | t | i | n | g | . | \n | R | e | d | e | f | i | n |
|---|---|---|---|---|---|---|---|---|---|---|---|---|----|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 |
| e | d | . | \n | F | r | e | e | . |   | R | u | n | s |   | e | v | e | r | y |   |
| 21 | 22 | 23 | 24 | 25 | 26 | 27 | 28 | 29 | 30 | 31 | 32 | 33 | 34 | 35 | 36 | 37 | 38 | 39 | 40 |   |
| w | h | e | r | e | . |   |   |   |   |   |   |   |   |   |   |   |   |   |   |   |
| 41 | 42 | 43 | 44 | 45 | 46 |   |   |   |   |   |   |   |   |   |   |   |   |   |   |   |

Note that a single node is enough to represent the document. The node's start is the beginning of the original buffer, and the end is the end of the original buffer. In terms of a portion of the populated data structure:

```
class Node {
    bufferIndex: 0;
    start: 0;
    length: 47;
}
```

The content the tree node represents is "Code editing.\nRedefined.\nFree. Runs everywhere.", so the lineStarts list or array in this text is [0, 14, 25], and a fuller representation of the structure of the populated tree node is:

```
class Node {
    bufferIndex: 0;
    start: 0;
    length: 47;
    lineStarts: [0, 14, 25]
}
```

Now suppose the user is going to add "Open Source." after "Free.". The editor will split the node into two nodes first, which look like:

```
class Node1 {
    bufferIndex: 0;
    start: 0;
    length: 31;
}
class Node2 {
    bufferIndex: 0;
    start: 31;
    length: 16;
}
```

Node1 now represents content "Code editing.\nRedefined.\nFree", so the lineStarts for the content is [0, 14, 25]. Node2 now represents content "Runs everywhere.", and the lineStarts for this substring is [0]. The populated structure of these two nodes will be:

```
class Node1 {
    bufferIndex: 0;
    start: 0;
    length: 31;
    lineStarts: [0, 14, 25]
}
class Node2 {
    bufferIndex: 0;
    start: 31;
    length: 16;
    lineStarts: [0]
}
```

As shown above, every time the editor splits a node into two, it will recompute and create the lineStarts property for every node. Usually source files have more lines than the example above, and the more lines a file has, the larger lineStarts is, and the lineStarts object is usually at least 4 bytes per entry with at least a hundred entries. Creating a lineStarts object every time a user makes an edits is costly. But an improvement can be made to avoid such post-edit recomputation, namely, storing line starts outside the nodes. This can be generalized to other text items, in addition to or in place of line starts, by giving each a respective offsets 230 list or array 502 which is external to the nodes 224.

In this example, to mitigate this recomputation issue one can put lineStarts information in Buffer:

```
class Buffer {
    value: string;
    lineStarts: number[ ];
}
```

Node only holds start and end buffer positions in that buffer:

```
class Node {
    bufferIndex: number;
    start: BufferPosition;
    end: BufferPosition;
}
```

With this change, every time when the editor creates a new Node, it only has to create start: BufferPosition and end: BufferPosition, which is less costly. This reduces object allocation, and reducing large object allocation can improve the speed significantly.

Among all the different available kinds of balanced binary trees, for the particular VS Code implementation the inventors choose a red-black tree because it was deemed most suitable for editing operations. However, other balanced trees could be used in other implementations.

Another variation, and opportunity for improving performance, involves reducing allocation of objects. Assume one stores the line break offsets in each node. Whenever an edit operation changes the node, the editor might have to update the line break offsets. For example, say we have a node that contains 999 line breaks, the lineStarts array has 1000 elements. If the editor splits the node evenly, then it will create two nodes, each having an array containing around 500 elements. As this is not directly operating on linear memory space, splitting an array into two is more costly than just moving pointers.

In this example, one bit of good news is that the buffers in a piece table are either readonly (original buffers) or append-only (changed buffers), so the line breaks within a buffer don't move. Node can hold two references to the line break offsets on its corresponding buffer. The less the editor does, the better the performance will be in terms of speed. Internal benchmarks showed that applying this change made the text buffer operations in one implementation three times faster. The following code illustrates use of Node to hold references to the line break offsets on its corresponding buffer:

```
class Buffer {
    value: string;
    lineStarts: number[ ];
}
class BufferPosition {
    index: number; // index in Buffer.lineStarts
    remainder: number;
}
class PieceTable {
    buffers: Buffer[ ];
    rootNode: Node;
}
class Node {
    bufferIndex: number;
    start: BufferPosition;
    end: BufferPosition;
    ...
}
```

More generally, this family of piece tree text buffering structures could be described in various ways, depending on what aspects are emphasized. One description is "Multiple buffer piece table derived with red-black tree, optimized for line model". A shorter, but still accurate description is "piece tree".

Benchmarking

Having a theoretical understanding of this data structure is one thing, while real world performance is another. The programming language used, the environment the text editor code runs in, the way clients invoke an editor API, and other factors may significantly affect performance outcomes.

Benchmarks can provide a more comprehensive picture, however, and benchmarks were run internally on small, medium, and large files against an earlier line array (i.e., array-of-lines) implementation and a subsequent piece tree implementation which includes performance-enhancing aspects described herein. Benchmark test results are shown in FIGS. 7-14, and discussed below.

Figure 7:
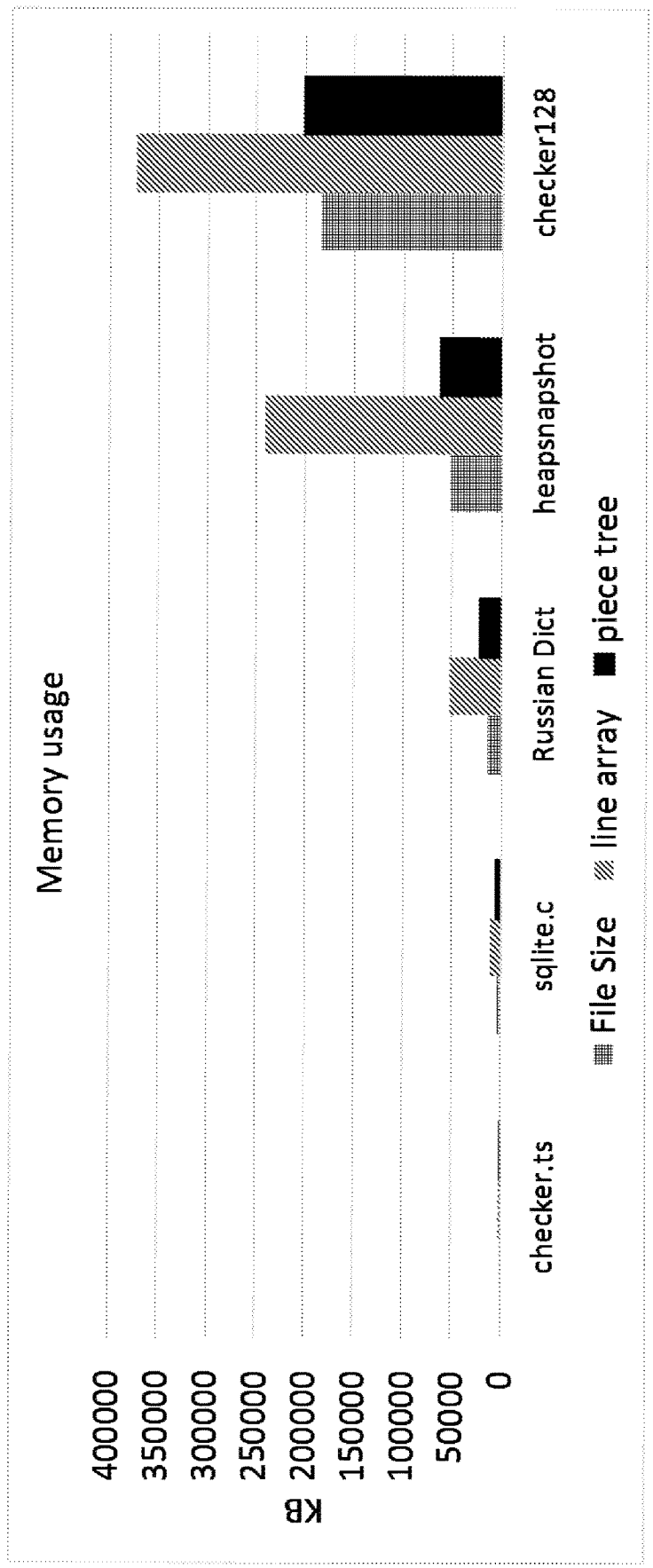
FIG. 7 is a bar graph illustrating memory usage test results.
Figure 8:
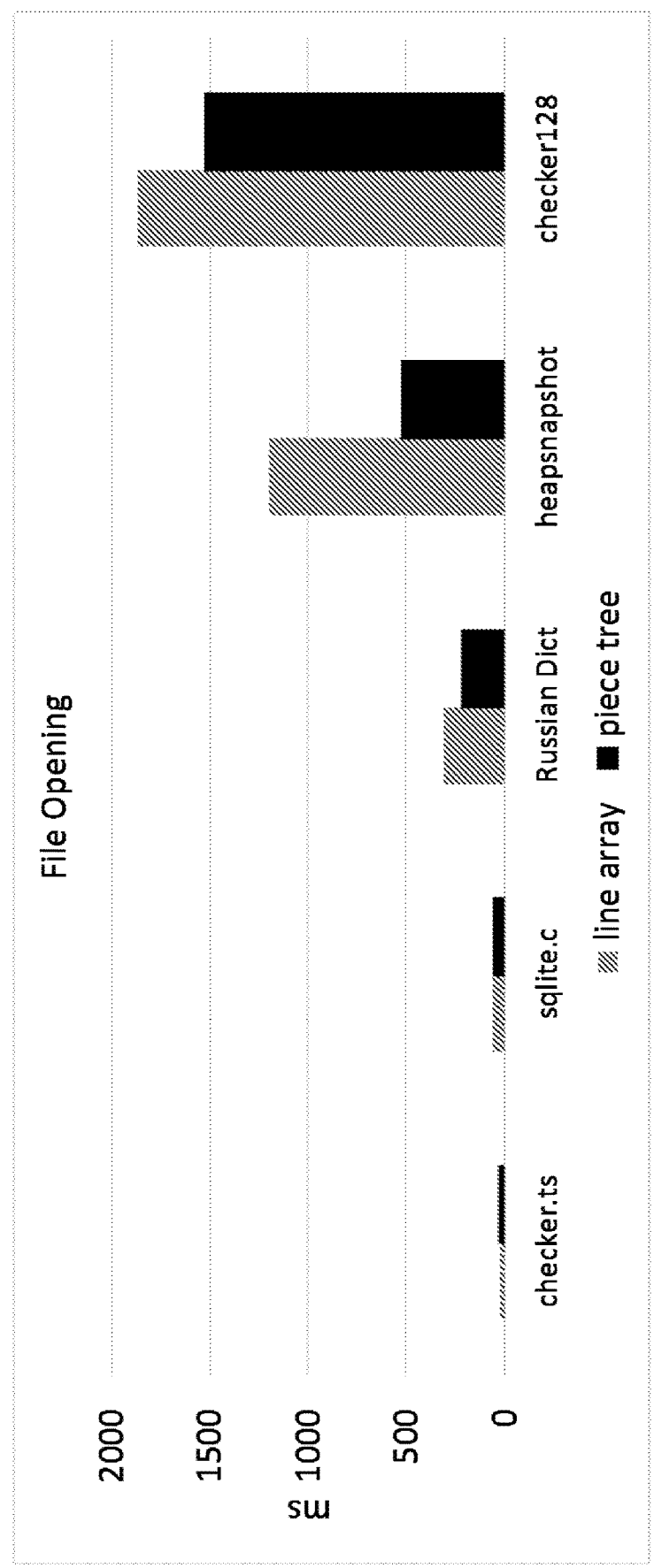
FIG. 8 is a bar graph illustrating file opening test results.
Figure 9:
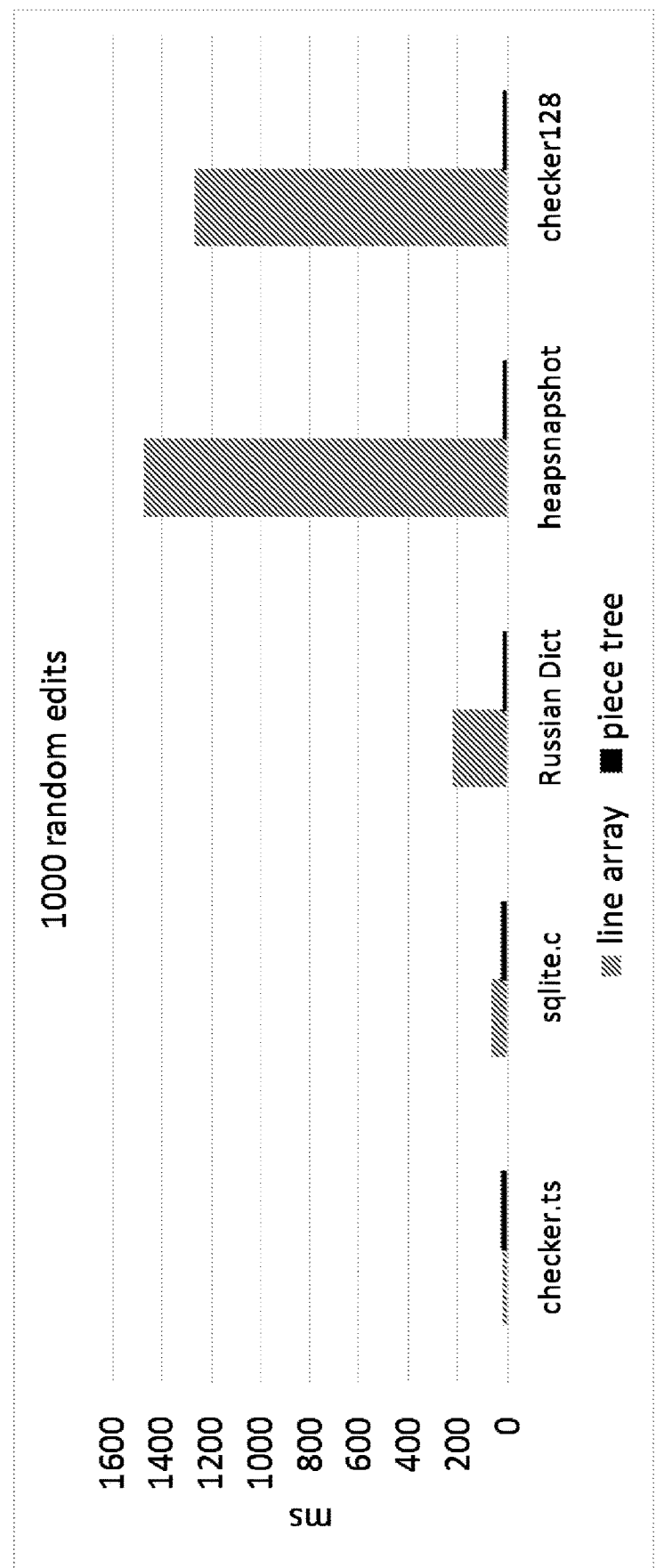
FIG. 9 is a bar graph illustrating random edit test results.
Figure 10:
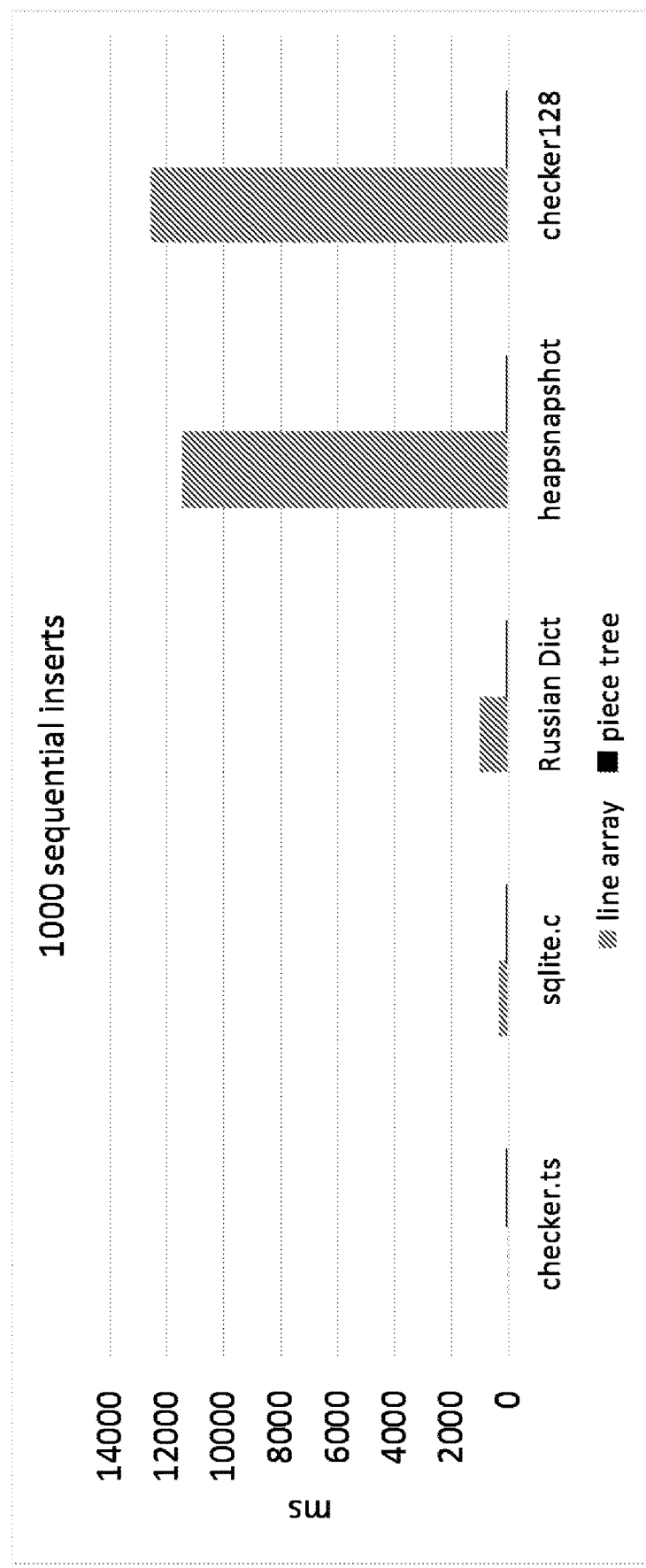
FIG. 10 is a bar graph illustrating sequential insert editing test results.

The benchmark test results support several conclusions about text buffering structures, among which are the following conclusions. First, the piece tree outperforms the array-of-lines by using less memory (RAM) for relatively large files (those with more than about 500K lines), as illustrated in FIG. 7. Second, the piece tree outperforms the array-of-lines by opening such relatively large files faster, as illustrated in FIG. 8. Third, the piece tree outperforms the array-of-lines by processing edit operations faster in all but the smallest files (files except those with less that 100K lines) as illustrated in FIGS. 9 and 10. Fourth, the array-of-lines is faster than the piece tree at reading a listing or listing portion from the populated buffering data structure, for most if not all files, depending on the particularities of the read and of prior edits, as illustrated in FIGS. 11-14. It would arguably have been better if the piece tree outperformed the array-of-lines in every tested scenario. But short of that result, it is still worthwhile to know the relative strengths and weaknesses of each text buffering structure, e.g., for permitting one to select between them accordingly depending on the scenarios likely to be encountered.

To obtain more accurate benchmark test results, test files used real-world scenario files, which were found online:
checker.ts—1.46 MB, 26 k lines.
sqlite.c—4.31 MB, 128 k lines.
Russian English Bilingual dictionary—14 MB, 552 k lines.
Two large files were also manually created for use in testing:
Chromium heap snapshot of newly opened VS Code Insider—54 MB, 3M lines.
checker.ts X 128—184 MB, 3M lines.

FIG. 7 shows results fora memory usage benchmark test. The memory usage of the piece tree immediately after loading is very close to the original file size, and it is significantly lower than the old array-of-lines (a.k.a. "line array") implementation.

FIG. 8 shows results fora file opening benchmark test. The piece tree structure-populating operations of finding and caching line breaks is much faster than splitting the file into an array of strings to populate the array-of-lines.

FIGS. 9 and 10 show results for editing benchmark tests. To test editing performance, these workflows were simulated:
Making edits in random positions in the document (FIG. 9).
Typing in sequence (FIG. 10).

In the first scenario simulation, 1000 random edits were applied to the document in question, and in the second scenario simulation 1000 sequential inserts to the document were made. The results show how much time was spent performing these operations for each text buffering structure. As expected, line array is faster when the file is very small. Accessing a random position in a small array and tweaking a string which has around 100-150 characters is very fast. The line array approach's performance starts to degrade when the file has many lines (about 100K or more).

Sequential inserts in large files make this situation worse as the JavaScript® engine does a lot of work in order to resize the large array. By contrast, piece tree code behaves in a stable fashion, as each edit includes only a string append and a few red-black tree operations.

FIGS. 11-14 show results for reading benchmark tests. To test reading performance, the "hottest" routine in the VS Code tool was identified, that is, the routine that is used the most to read from the text buffer.

Figure 11:
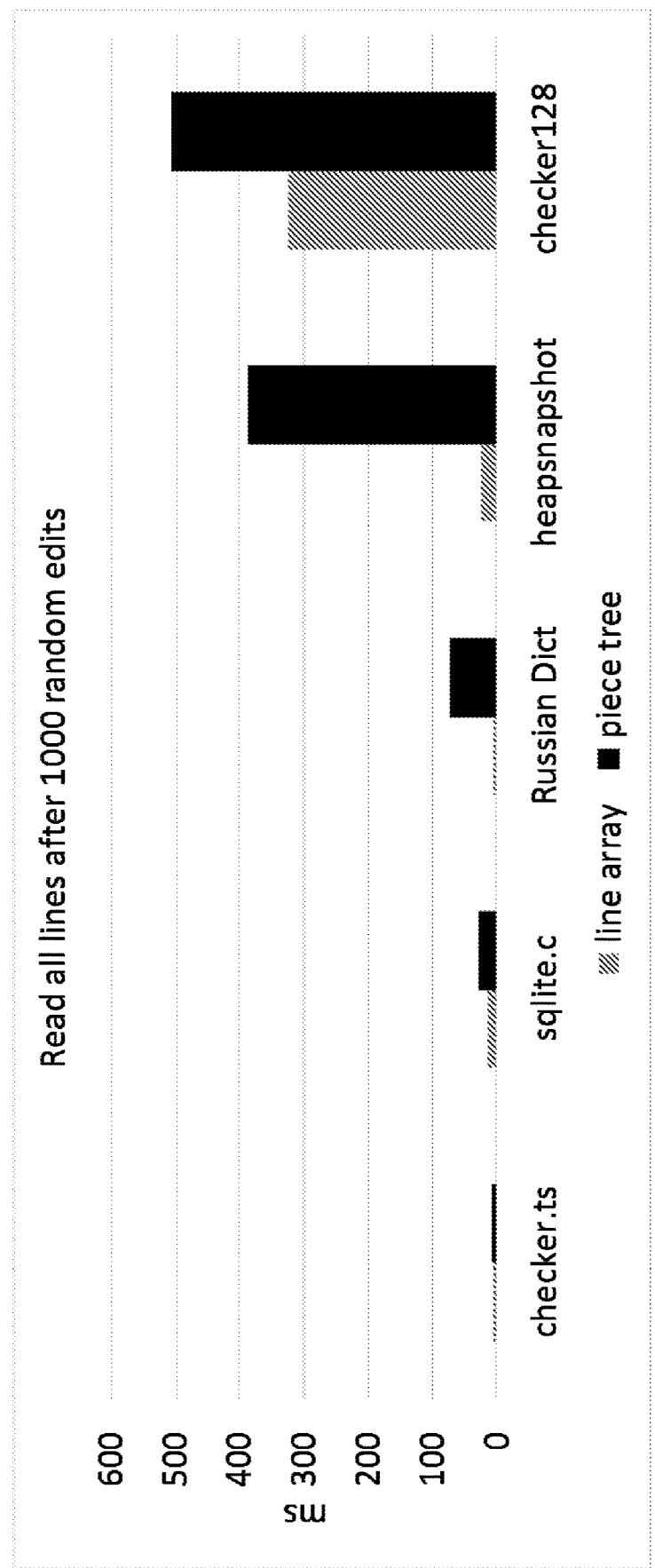
FIG. 11 is a bar graph illustrating test results for reading after random edits.
Figure 12:
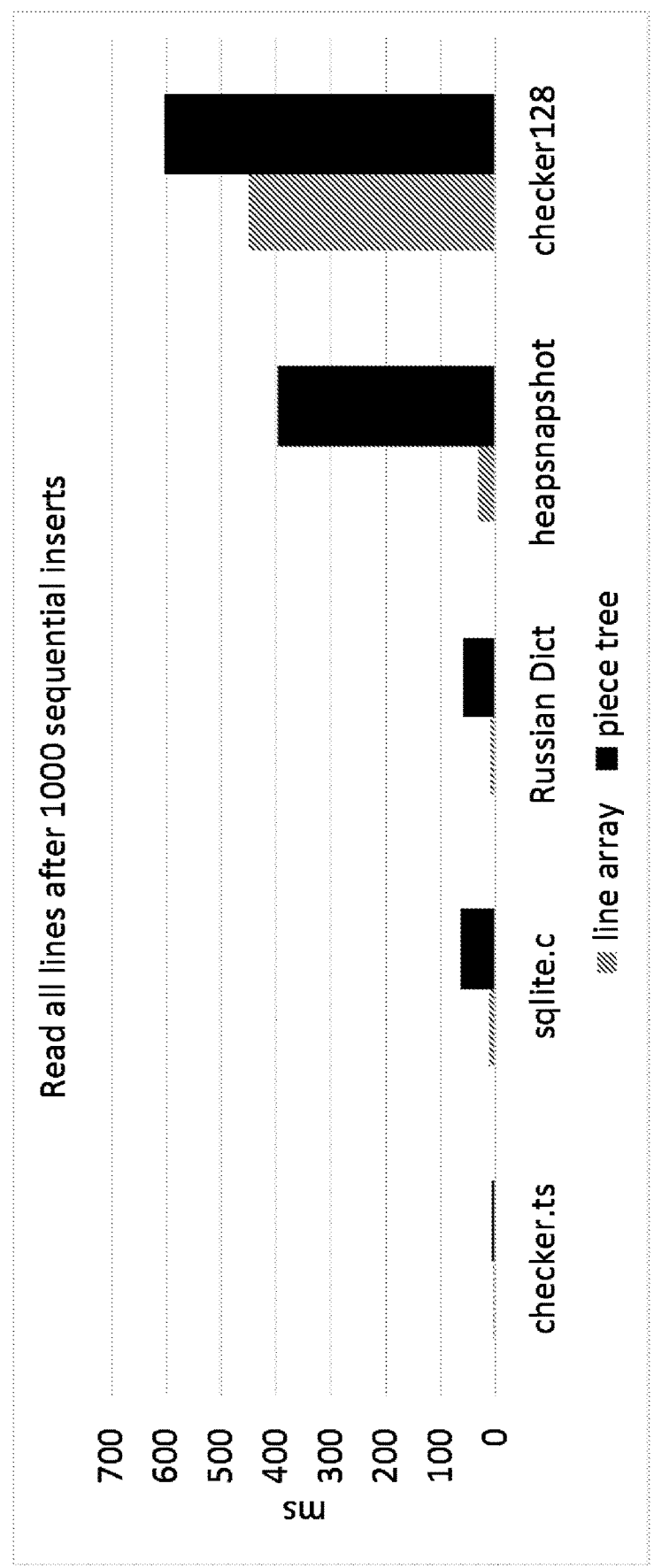
FIG. 12 is a bar graph illustrating test results for reading after sequential insert edits.
Figure 13:
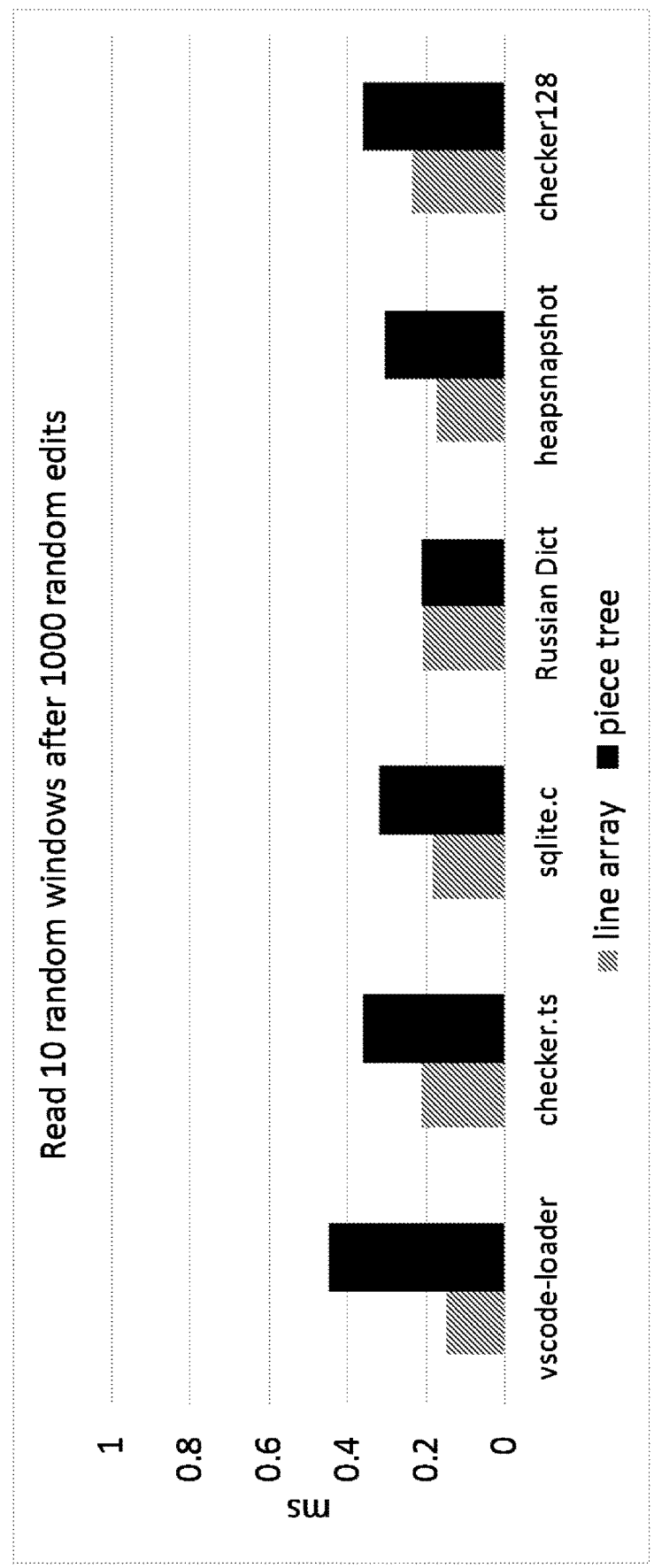
FIG. 13 is a bar graph illustrating test results for reading random windows after random edits.
Figure 14:
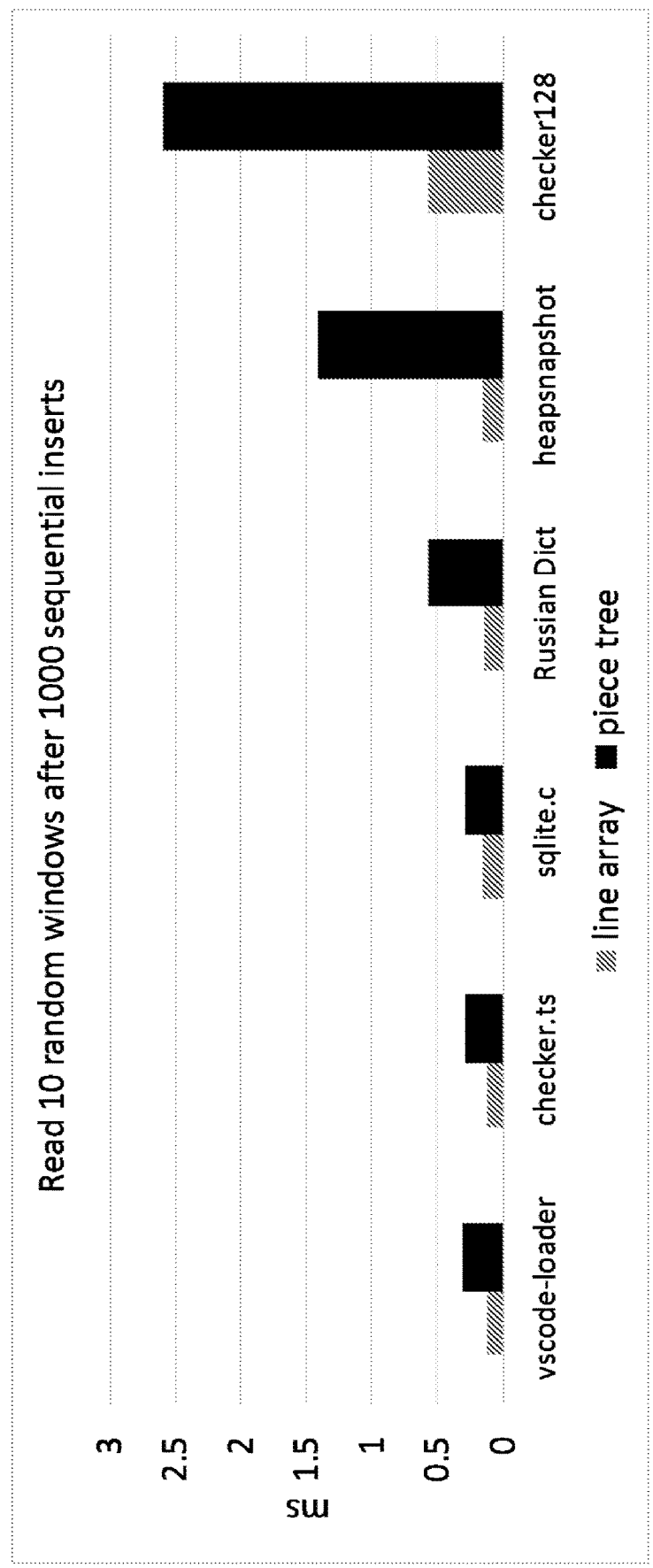
FIG. 14 is a bar graph illustrating test results for reading random windows after sequential insert edits.

For VS Code text buffers, the hottest method is getLineContent. It is invoked by the view code, by the tokenizer, the link detector, and almost every component that reads document content. Some of the buffer reading code traverses the entire file, such as the link detector, while other buffer reading code reads only a window of sequential lines, such as the view code. The testing benchmarked performance of the getLineContent method in various scenarios:
Call getLineContent for all lines after doing 1000 random edits (FIG. 11).
Call getLineContent for all lines after doing 1000 sequential inserts (FIG. 12).
Read 10 distinct line windows after doing 1000 random edits (FIG. 13).
Read 10 distinct line windows after doing 1000 sequential inserts (FIG. 14).

The reading benchmark tests revealed a performance weakness of piece tree buffering. Unless nodes have been consolidated, a piece tree representing a large file which has been subjected to thousands of edits will have thousands or tens of thousands of nodes. Even though looking up a line is $O(\log N)$, where N is the number of nodes, that is significantly more than $O(1)$ which the line array enjoyed.

Having thousands of unconsolidated edits is relatively rare. It might happen after replacing a commonly occurring sequence of characters in a large file. Also, for context note that execution of each getLineContent call takes only microseconds, and such calls are a relatively small part of VS Code execution overall. Most getLineContent calls are made from view rendering and tokenization, and the post processes of line contents are much more time consuming. DOM construction and rendering or tokenization of a view port usually takes tens of milliseconds, in which getLineContent only accounts for less than 1%. Moreover, a consolidation is possible, in which a text editor recreates buffers and nodes if a high number of nodes are present, to consolidate strings by concatenating them or actually deleting nominally deleted intervening substrings, and reducing the number of nodes.

In short, piece tree outperforms line array in most text editor scenarios, with the exception of line-based lookup.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

Conclusion

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 6, 15 and 16 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A text editor data buffering storage and retrieval system for a computer memory, comprising:
    a processor;
    a memory in operable communication with the processor;
    a human-readable display capable of being configured with a listing of text-as-edited;
    text buffering structure configuring code which upon execution with the processor configures a portion of the computer memory according to an enhanced piece tree data structure, the enhanced piece tree data structure including at least two string buffers, the enhanced piece tree data structure also including a tree having at least two nodes, the string buffers being external to the tree, each node including a substring identifier which identifies a substring of the text-as-edited, the substring stored in one of the string buffers, at least one node of the enhanced piece tree data structure also including at least one of the following offsets: (a) a format text item offset which specifies a location of a format text item that describes a line, a paragraph, a line wrapping point, or a letter case encountered in the substring, or (b) a content text item offset which specifies a location of a content text item that describes an opening glyph or a closing glyph encountered in the substring; and
    text buffering structure traversing code which upon execution with the processor traverses the enhanced piece tree data structure, reads the nodes including the at least one offset, reads from one or more of the string buffers, and produces the listing of text-as-edited consistent with the string buffers and the at least one offset;
    wherein the listing is based on one or more text edits that are represented by at least some of the nodes, and the listing shows a result of performing the text edits on one or more strings that are stored in the string buffers.

2. The system of claim 1, wherein at least one of the nodes identifies the substring by specifying a start position of the substring in one of the string buffers and also specifying an end position of the substring in that string buffer.

3. The system of claim 1, wherein the enhanced piece tree data structure includes at least a thousand format text item offsets.

4. The system of claim 1, wherein an offset of a text item c is represented in the enhanced piece tree data structure by using a variable denoted here as j combined with a variable denoted here as d, where j is an index into a list or array of line start positions, and d is a distance in characters from the line start position identified by j to the location of c in a line corresponding to j.

5. The system of claim 1, wherein the enhanced piece tree data structure includes a list or array which contains or points to at least two of the string buffers.

6. The system of claim 1, wherein the tree is a balanced binary tree.

7. The system of claim 1, further comprising text buffering structure consolidating code which upon execution with the processor reconfigures the memory by consolidating nodes, thereby reducing the number of nodes.

8. The system of claim 1, wherein the enhanced piece tree data structure includes the multiple text item offsets in an offsets list or array which is external to the nodes, thereby avoiding post-edit recomputation which would occur if text item offsets were instead stored in one or more nodes.

9. A method suitable for use in a text editor for buffering data by configuring a portion of a computer memory according to an enhanced piece tree data structure, the method comprising:
  configuring a tree having at least two nodes;
  configuring at least two string buffers;
  identifying in each node by string extent values a substring that is stored in one of the string buffers;
  specifying, by multiple text item offsets, respective locations of text item instances in strings that are stored in at least one of the string buffers, each said text item instance including a format text item or a content text item as opposed to including text generally, wherein each format text item represents a line, a paragraph, a line wrapping point, or a letter case in the substring, and each content text item represents an opening glyph or a closing glyph in the substring; and
  representing a text edit using at least two of the nodes, by performing at least one of the following reconfigurations of the enhanced piece tree data structure:
    when the edit inserts one or more characters into one or more substrings, splitting a node into two nodes, inserting a new node between the two nodes, and identifying the one or more inserted characters using the new node, and updating or checking text item offsets such that the text item offsets match the edited substring;
    when the edit deletes one or more characters of a substring, splitting a node into two nodes and modifying string extent values to omit the one or more deleted characters, and updating or checking text item offsets such that the text item offsets match the edited substring.

10. The method of claim 9, further comprising outperforming an array-of-lines data structure in at least one of the following ways:
  using less memory in the enhanced piece tree data structure to hold a listing having at least five hundred thousand lines than is used to hold the listing in the array-of-lines data structure; or
  populating the enhanced piece tree data structure with a listing having at least five hundred thousand lines faster than the array-of-lines data structure is populated with the listing.

11. The method of claim 9, further comprising performing a search-and-replace operation on a buffer-by-buffer basis.

12. The method of claim 9, wherein the nodes represent one or more text edits performed on one or more strings that are stored in the string buffers, wherein a listing is a result of performing all of the text edits represented by the nodes, wherein the method further comprises saving to a file a complete copy of the listing while allowing further text edits to be performed during the saving, and wherein the saving includes creating a copy of the nodes in memory and the saving includes avoiding creating a complete copy of the listing in memory, thereby reducing the amount of memory which is used to perform file saving while continuing to allow file editing.

13. The method of claim 9, wherein the nodes represent one or more text edits performed on one or more strings that are stored in the string buffers, wherein a listing is a result of performing all of the text edits represented by the nodes, and a selection is at least a portion of the listing, wherein the method further comprises cutting and pasting a selection in the text editor, and wherein the cutting and pasting includes creating a copy of the nodes in memory and the cutting and pasting includes avoiding creating a complete copy of the selection in memory, thereby reducing the amount of memory which is used to perform cutting and pasting within the text editor.

14. The method of claim 9, further comprising traversing the tree and reading from one or more of the string buffers, thereby producing a listing which shows a result of performing text edits that are represented by the nodes.

15. The method of claim 9, wherein specifying locations of text item instances in strings that are stored in the string buffers includes specifying line break locations or line start locations or both without placing either line break offsets or line start offsets in the nodes.

16. A computer-readable storage medium configured with executable code for configuring a portion of a computer memory according to a piece tree data structure, the method comprising:
  configuring a balanced tree having at least two nodes;
  configuring at least two string buffers external to the nodes;
  identifying in each node by string extent values a substring that is stored in one of the string buffers;
  specifying, by multiple text item offsets, respective locations of text item instances in strings that are stored in at least one of the string buffers, each said text item instance including a format text item or a content text item as opposed to including text generally, wherein each format text item represents a line, a paragraph, a line wrapping point, or a letter case in the substring, and each content text item represents an opening glyph or a closing glyph in the substring;
  producing a listing which shows a result of performing a plurality of text edits which are represented by the nodes, the producing including traversing the tree and reading from the nodes and string buffers to produce the listing consistent with the string buffers and the multiple item offsets; and
  displaying the listing in human-readable form on a computing system display.

17. The computer-readable storage medium of claim 16, wherein the displayed listing is based on text from a file having a file size of at least two megabytes.

18. The computer-readable storage medium of claim 16, wherein one of the following conditions holds:
   the executable code for traversing or configuring the tree is written at least partially in an interpreted programming language and during the execution of that code by a processor the processor spends less than ten percent of its processor cycles executing compiled code; or
   the executable code for traversing or configuring the tree is written at least partially in a compiled programming language and during the execution of that code by a processor the processor spends more than sixty percent of its processor cycles executing compiled code.

19. The computer-readable storage medium of claim 16, wherein the method further comprises reading from a file which contains computer program source code, wherein the method configures the tree and the string buffers for displaying the source code and for editing of the source code, and wherein the method specifies source code line starts or source code line breaks or both as text item instances using text item offsets.

20. The computer-readable storage medium of claim 16, wherein the method comprises utilizing a piece tree data structure to hold text in memory during editing and the method comprises avoiding utilizing a piece table data structure to hold text in memory during editing.

\* \* \* \* \*